(12) United States Patent
Lee

(10) Patent No.: US 12,083,405 B2
(45) Date of Patent: Sep. 10, 2024

(54) BICYCLE SIMULATOR AND BLOCKCHAIN NETWORK SYSTEM USING SAME

(71) Applicant: REAL DESIGN TECH CO., LTD., Gyeonggi-do (KR)

(72) Inventor: Joong Sik Lee, Gyeonggi-do (KR)

(73) Assignee: REAL DESIGN TECH CO., LTD., Gyeonggi-Do (KR)

( * ) Notice: Subject to any disclaimer, the term of this patent is extended or adjusted under 35 U.S.C. 154(b) by 288 days.

(21) Appl. No.: 17/614,010

(22) PCT Filed: May 20, 2020

(86) PCT No.: PCT/KR2020/006565
§ 371 (c)(1),
(2) Date: Nov. 24, 2021

(87) PCT Pub. No.: WO2020/242115
PCT Pub. Date: Dec. 3, 2020

(65) Prior Publication Data
US 2022/0219066 A1     Jul. 14, 2022

(30) Foreign Application Priority Data

May 24, 2019 (KR) .................. 10-2019-0061456
Sep. 3, 2019 (KR) .................. 10-2019-0108934

(51) Int. Cl.
*A63B 71/06*     (2006.01)
*A63B 22/06*     (2006.01)
(Continued)

(52) U.S. Cl.
CPC ...... *A63B 71/0622* (2013.01); *A63B 22/0605* (2013.01); *A63B 24/0062* (2013.01);
(Continued)

(58) Field of Classification Search
CPC ............ A63B 71/0622; A63B 22/0605; A63B 24/0062; A63B 2024/0096;
(Continued)

(56) References Cited

U.S. PATENT DOCUMENTS

| 4,887,967 A | 12/1989 | Letovsky et al. |
| 4,932,651 A | 6/1990 | Defaux |

(Continued)

FOREIGN PATENT DOCUMENTS

| CN | 1873733 A | 12/2006 |
| CN | 206103261 | 4/2017 |

(Continued)

OTHER PUBLICATIONS

Office Action issued in corresponding CN Application No. 202080038311.0, issued May 7, 2022, and an English translation, 20 pages.

(Continued)

*Primary Examiner* — Andrew S Lo
(74) *Attorney, Agent, or Firm* — Guntin & Gust, PLC; Miyoung Shin

(57) ABSTRACT

Provided is a bicycle simulator including: a base portion; a frame support portion connected to the base portion to be movable in one direction and supporting a frame of a mounted bicycle connecting a front wheel and a rear wheel of the bicycle; a first sensor configured to sense a moving distance and a moving direction of the frame support portion in the one direction; a communication circuit configured to receive the moving distance and the moving direction of the frame support portion sensed by the first sensor; a processor configured to generate a bicycle avatar of which a traveling direction changes according to the moving distance and the moving direction of the frame support portion transmitted (Continued)

from the communication circuit; and a display configured to display a traveling state of the bicycle avatar.

21 Claims, 21 Drawing Sheets

(51) Int. Cl.
    *A63B 24/00*         (2006.01)
    *G06Q 20/06*        (2012.01)
    *G06Q 40/04*        (2012.01)

(52) U.S. Cl.
    CPC ......... *G06Q 20/0658* (2013.01); *G06Q 40/04* (2013.01); *A63B 2024/0096* (2013.01); *A63B 2071/0627* (2013.01); *A63B 2071/0644* (2013.01); *A63B 2220/20* (2013.01); *A63B 2220/30* (2013.01); *A63B 2220/833* (2013.01); *A63B 2230/015* (2013.01)

(58) Field of Classification Search
    CPC .... A63B 2071/0627; A63B 2071/0644; A63B 2220/20; A63B 2220/30; A63B 2220/833; A63B 2230/015; A63B 2071/0638; A63B 2220/13; A63B 2225/15; A63B 24/0087; A63B 2071/068; A63B 2220/808; A63B 2225/20; A63B 2225/50; A63B 71/0686; A63B 69/16; A63B 2069/166; A63B 24/0021; A63B 2024/0065; A63B 2069/161; A63B 2069/163; A63B 2069/165; A63B 2071/0658; A63B 2071/0694; A63B 2208/0228; G06Q 20/0658; G06Q 40/04; G06Q 20/02; G06Q 20/367; G06Q 2220/00; H04L 67/104; H04L 9/50

See application file for complete search history.

(56) References Cited

U.S. PATENT DOCUMENTS

| | | | | |
|---|---|---|---|---|
| 4,958,832 A * | 9/1990 | Kim | ....................... | A63B 22/16 |
| | | | | 482/61 |
| 5,076,792 A | 12/1991 | Niermann | | |
| 7,081,070 B1 * | 7/2006 | Washington | ....... | A63B 22/0605 |
| | | | | 434/61 |
| 7,491,154 B2 | 2/2009 | Yonehana et al. | | |
| 9,987,514 B1 * | 6/2018 | Tung | ................... | A63B 22/0605 |
| 10,265,580 B2 * | 4/2019 | Kalogiros | .......... | A63B 24/0075 |
| 10,424,404 B2 | 9/2019 | Ohnemus et al. | | |
| 11,383,127 B1 * | 7/2022 | Houchin-Miller | .......................... | |
| | | | | A63B 22/0605 |
| 2002/0055422 A1 * | 5/2002 | Airmet | ................... | A63F 13/245 |
| | | | | 482/61 |
| 2005/0221960 A1 * | 10/2005 | Miyamaru | ......... | A63B 22/0605 |
| | | | | 482/8 |
| 2006/0270527 A1 * | 11/2006 | Hanaya | .................. | G09B 9/058 |
| | | | | 482/8 |
| 2018/0072365 A1 * | 3/2018 | Kalenga | ............ | A63B 22/0046 |
| 2019/0070456 A1 * | 3/2019 | Tung | ................ | A63B 22/0605 |
| 2020/0230461 A1 | 7/2020 | Lee | | |
| 2021/0093922 A1 * | 4/2021 | Lee | ..................... | A63B 22/0605 |
| 2022/0001234 A1 * | 1/2022 | Pirscher | ............. | A63B 22/0076 |
| 2022/0105408 A1 * | 4/2022 | Lee | ..................... | A63B 22/0605 |
| 2022/0176197 A1 * | 6/2022 | Pacheco Hernandez | ..................... | |
| | | | | A63B 24/0087 |
| 2022/0249905 A1 * | 8/2022 | Bass | .................... | A63B 26/003 |
| 2022/0323823 A1 * | 10/2022 | Lee | .................... | A63B 22/0023 |

FOREIGN PATENT DOCUMENTS

| | | |
|---|---|---|
| CN | 106861181 A | 6/2017 |
| JP | 2019503020 A | 1/2019 |
| KR | 1020140063167 A | 5/2014 |
| KR | 1020160076547 A | 7/2016 |
| KR | 101780743 B | 9/2017 |
| KR | 101827306 B1 | 2/2018 |
| KR | 101914576 B1 | 11/2018 |
| WO | 92/16267 A2 | 10/1992 |

OTHER PUBLICATIONS

International Search Report for International Application No. PCT/KR2020/006565, mailed Aug. 28, 2020, English Translation, 11 pages.

Office Action issued to corresponding Korean Application No. 10-2019-0108934, issued Jan. 15, 2021 and English Translation thereof, 21 pages.

Grant of Patent issued to corresponding Korean Application No. 10-2019-0108934, issued Jul. 28, 2021 and English Translation thereof, 3 pages.

Extended European Search Report for Counterpart European Patent Application No. 20813412.2, Jun. 12, 2023, 10pgs.

* cited by examiner

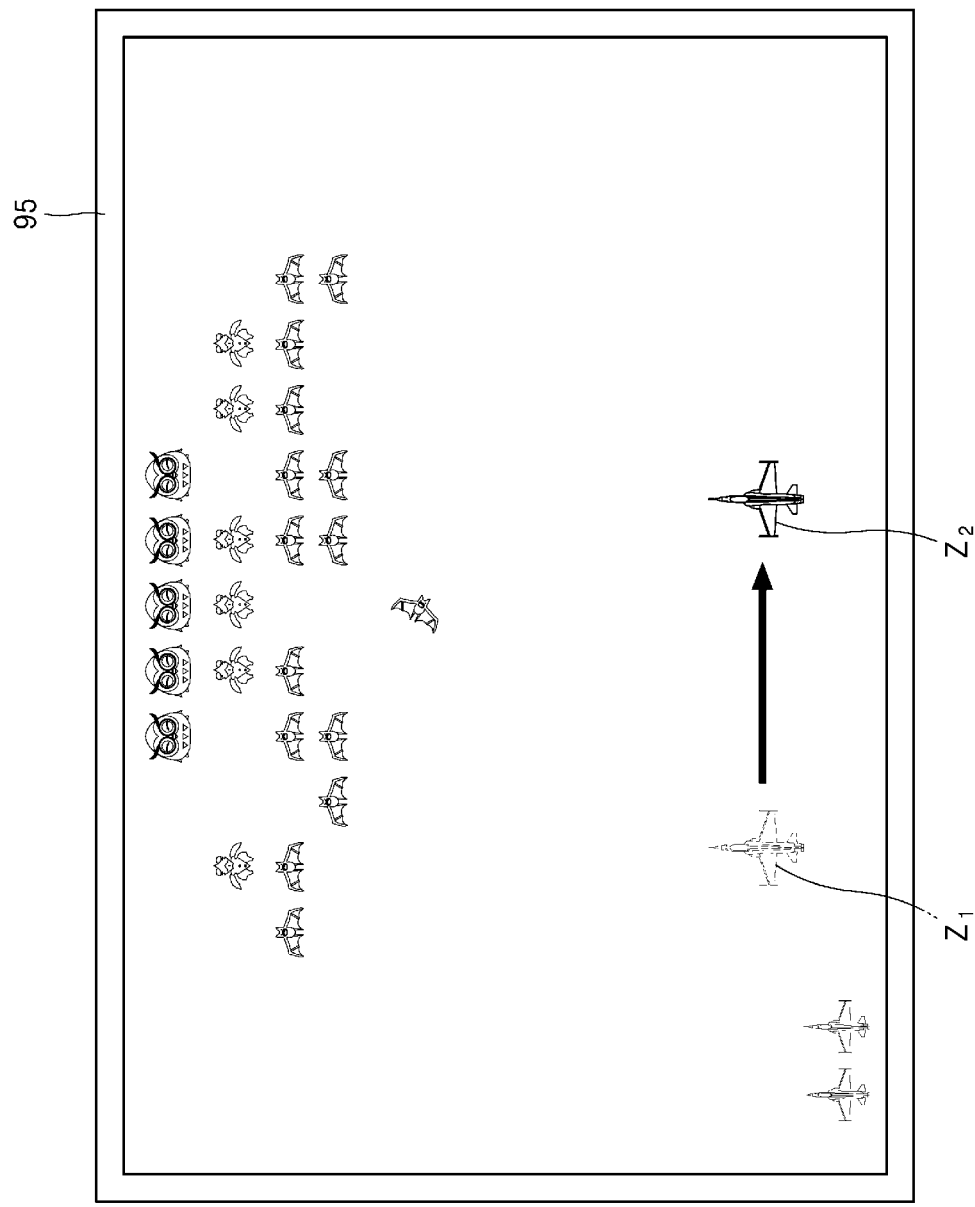

BICYCLE SIMULATOR AND BLOCKCHAIN NETWORK SYSTEM USING SAME

TECHNICAL FIELD

The disclosure relates to a bicycle simulator for virtual traveling and a blockchain network system using the same, and more particularly, to a bicycle simulator that allows various traveling paths to be virtually experienced in an indoor space and allows riders in different spaces to virtually experience a bicycle riding experience in the same cyberspace, and a blockchain network system that generates and trades a cryptocurrency by using the same.

BACKGROUND ART

In general, a bicycle exercise equipment called a bicycle trainer or a bicycle roller is the most widely used indoor exercise equipment along with a treadmill and strengthens lower body strength in a manner in which a rider riding a bicycle mounted on a rotating roller or a cradle uses pedals to rotate wheels to which rotational resistance force (magnetic force, etc.) is applied.

Such a conventional bicycle exercise equipment may provide a fairly high exercise effect to the rider even with a relatively short time of exercise, through adjustment of the rotational resistance force applied to the wheels regardless of the weather.

However, because conventional bicycle exercise equipment continues only a pedaling exercise in which rotational resistance force is applied while facing a wall, etc. in an enclosed indoor space, it is not possible to provide the rider with the pleasure of actual bicycle riding at all. Thus, due to the boredom or loss of interest, there has been a problem in which it is difficult for the rider to sustain a continuous pedaling exercise.

Also, conventional bicycle exercise equipment has a problem in that, by only performing bicycle pedaling alone in the enclosed indoor space, the rider is unable to experience a bicycle riding experience together with another rider.

DESCRIPTION OF EMBODIMENTS

Technical Problem

The disclosure is to provide a bicycle simulator that allows a rider to experience the same traveling experience as traveling in an outdoor traveling environment even indoors by changing a traveling state of a bicycle avatar implemented on a display according to a traveling state of a bicycle supported on a bicycle cradle.

Also, the disclosure is to provide a bicycle simulator that allows a bicycle riding experience to be shared with a rider located in another space in the cyberspace.

Further, the disclosure is to provide a blockchain network system that generates a cryptocurrency by using exercise amount data obtained by using the bicycle simulator and trades the cryptocurrency.

Solution to Problem

A bicycle simulator according to an embodiment of the disclosure includes: a base portion; a frame support portion connected to the base portion to be movable in one direction and supporting a frame of a mounted bicycle connecting a front wheel and a rear wheel of the bicycle; a first sensor configured to sense a moving distance and a moving direction of the frame support portion in the one direction; a communication circuit configured to receive the moving distance and the moving direction of the frame support portion sensed by the first sensor; a processor configured to generate a bicycle avatar of which a traveling direction changes according to the moving distance and the moving direction of the frame support portion transmitted from the communication circuit; and a display configured to display a traveling state of the bicycle avatar.

The bicycle simulator may further include: a slide guide arranged to be fixed between both sides of the base portion and extending in one direction; and a slide portion fixed to one end of the frame support portion and connected to be movable on the slide guide in the one direction, wherein the first sensor may be configured to sense a moving direction and a moving distance of the slide portion moving on the slide guide.

The processor may be configured to determine a traveling direction of the bicycle avatar according to the moving direction of the frame support portion, and determine a position of the bicycle avatar on a traveling path according to the moving distance of the frame support portion.

The bicycle simulator may further include: a front wheel roller supporting the front wheel of the bicycle and rotating together with rotation of the front wheel; a rear wheel roller supporting the rear wheel of the bicycle and rotating together with rotation of the rear wheel; and a second sensor configured to sense a rotation speed and a rotation distance of at least one of the front wheel roller and the rear wheel roller.

The processor may be configured to determine a traveling speed of the bicycle avatar according to the rotation speed of at least one of the front wheel roller and the rear wheel roller sensed by the second sensor, and determine a traveling distance of the bicycle avatar according to the rotation distance of at least one of the front wheel roller and the rear wheel roller sensed by the second sensor.

The bicycle simulator may further include: a weight measurement portion configured to measure a weight of a rider riding the bicycle; and an input portion configured to input at least one of a model of the bicycle and information about the rider riding the bicycle.

The processor may be configured to generate a bicycle avatar according to information about the rider and the bicycle input by the weight measurement portion and the input portion, respectively.

The bicycle simulator may further include a third sensor arranged on each of both side surfaces of the base portion to sense a contact between the slide portion and one side surface of the base portion.

The processor may be configured to, when the contact of one of both side surfaces of the slide portion and the base portion is sensed by the third sensor, adjust a traveling path of the bicycle avatar so that the bicycle avatar travels along a particular path.

The particular path may be a traveling environment including a forked road, and a traveling direction of the forked road is determined according to the side surface of the base portion in contact with the slide portion.

The processor may be configured to, when the bicycle avatar is arranged to be adjacent to an obstacle or another avatar with a certain interval or less, display a warning message on the display.

The processor may be configured to determine the traveling state of the bicycle avatar on a flat traveling road and an inclined traveling road on which the bicycle avatar travels, according to the rotation speed of at least one of the front wheel roller and the rear wheel roller sensed by the second sensor.

When the bicycle avatar travels in a traveling environment including a forked road, a traveling direction of the forked road may be determined according to a change in the moving direction sensed by the first sensor.

A blockchain network system according to an embodiment includes: a cryptocurrency issuance device configured to generate a cryptocurrency according to exercise amount data obtained from a bicycle simulator; and a node computer configured to form the cryptocurrency issuance device and a blockchain network.

The node computer may include at least one user node that is used by a rider using the bicycle simulator and receives the cryptocurrency generated by the cryptocurrency issuance device.

The node computer may include at least one trader node that trades the cryptocurrency with the at least one user node.

A range of the blockchain network may be set differently according to a range of a participant participating in the blockchain network among the at least one user node and the at least one trader node.

The blockchain network system may further include an exercise amount verification device configured to verify exercise amount data achieved by using the bicycle simulator and transmit the exercise amount data to the cryptocurrency issuance device.

A bicycle simulator according to an embodiment includes: a base portion; a frame support portion connected to the base portion to be movable in one direction and supporting a frame of a mounted bicycle connecting a front wheel and a rear wheel of the bicycle; a first sensor configured to sense a moving distance and a moving direction of the frame support portion in the one direction; a communication circuit configured to receive the moving distance and the moving direction of the frame support portion sensed by the first sensor; a processor configured to generate a character of which a traveling direction changes according to the moving distance and the moving direction of the frame support portion transmitted from the communication circuit; and a display configured to display a traveling state of the character.

The bicycle simulator may further include: a slide guide arranged to be fixed between both sides of the base portion and extending in one direction; and a slide portion fixed to one end of the frame support portion and connected to be movable on the slide guide in the one direction, wherein the first sensor may be configured to sense a moving direction and a moving distance of the slide portion moving on the slide guide.

The processor may be configured to determine a moving direction of the character according to the moving direction of the frame support portion, and determine a position of the character according to the moving distance of the frame support portion.

The bicycle simulator may further include: a front wheel roller supporting the front wheel of the bicycle and rotating together with rotation of the front wheel; a rear wheel roller supporting the rear wheel of the bicycle and rotating together with rotation of the rear wheel; and a second sensor configured to sense a rotation speed and a rotation distance of at least one of the front wheel roller and the rear wheel roller.

The processor may be configured to determine a forward or backward movement of the character according to the rotation speed of at least one of the front wheel roller and the rear wheel roller sensed by the second sensor.

The processor may be configured to determine whether or not to fire a projectile to be fired from the character or a firing speed of the projectile, according to the rotation speed of at least one of the front wheel roller and the rear wheel roller sensed by the second sensor.

Advantageous Effects of Disclosure

According to the disclosure, as a traveling state of a bicycle avatar implemented on a display changes according to a traveling state of a bicycle mounted on a bicycle cradle, a rider may virtually experience the same state as an outdoor traveling environment even indoors, and thus, the rider may enjoy more realistic riding indoors as well.

Also, because the rider shares a bicycle riding experience with a rider located in another space in the cyberspace, the rider may be provided with a virtual riding environment which is more realistic and exciting.

Further, a blockchain network system that generates a cryptocurrency by using exercise amount data obtained by using the bicycle simulator and trades the cryptocurrency may be formed.

BRIEF DESCRIPTION OF DRAWINGS

FIGS. 13A to 13C are display screens for displaying a game progress state according to an embodiment.

MODE OF DISCLOSURE

Figure 1:
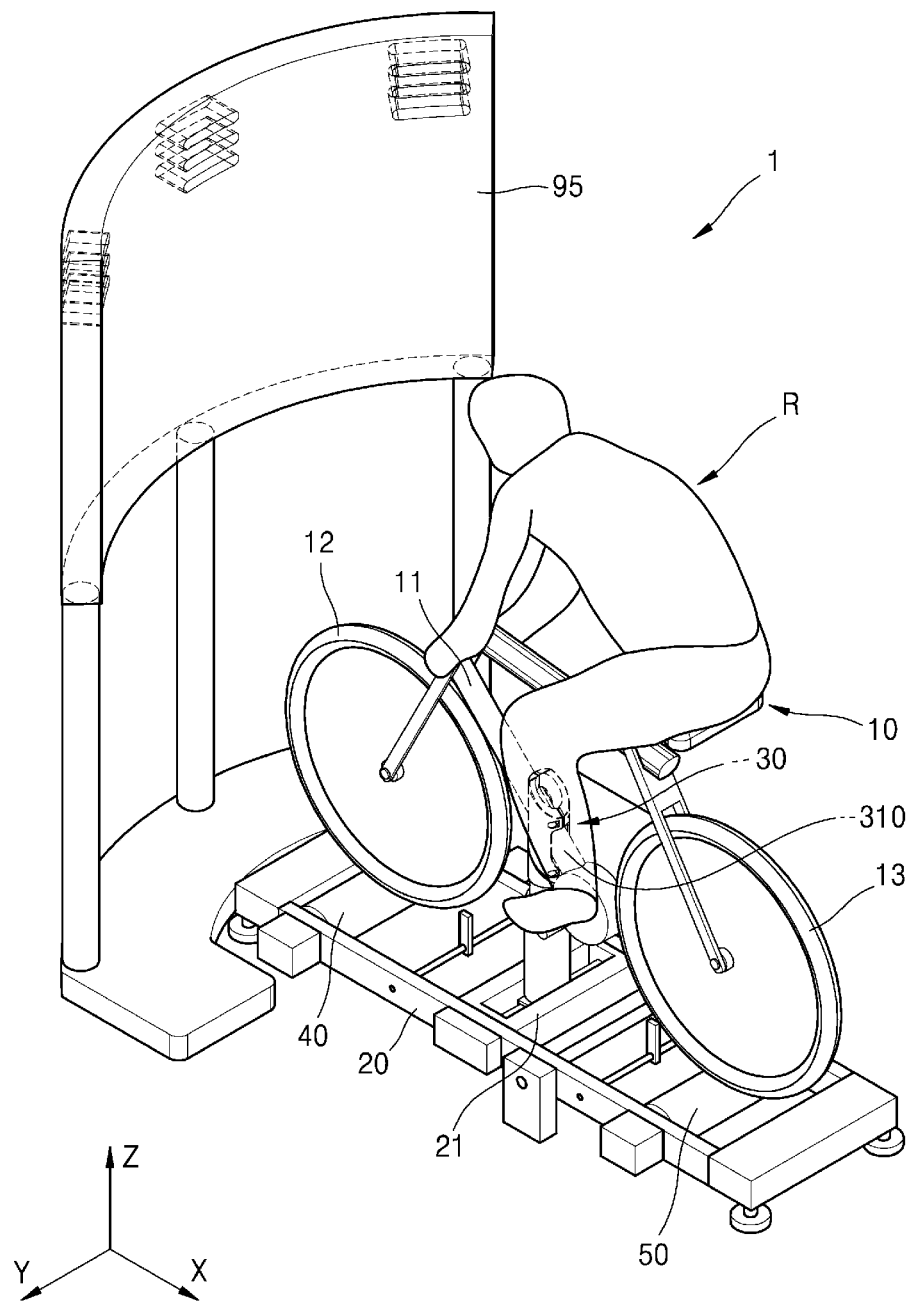
FIG. 1 is a perspective view of a bicycle simulator according to an embodiment of the disclosure.

The disclosure will now be described more fully with reference to the accompanying drawings, in which the following embodiments of the disclosure are shown. Like reference numerals in the drawings denote like elements, and thus their description will be omitted.

Because the embodiments may have various modifications, particular embodiments will be illustrated in the drawings and described in detail in the detailed description. Effects and characteristics of the disclosure, and methods of accomplishing them will be apparent by referring to embodiments described with reference to the drawings. The embodiments may, however, be embodied in many different forms and should not be construed as limited to the embodiments set forth herein.

While such terms as "first" and "second" may be used to describe various elements, such elements must not be limited to the above terms. The above terms are used to distinguish one element from another.

The singular forms "a," "an," and "the" as used herein are intended to include the plural forms as well unless the context clearly indicates otherwise.

In the following embodiments, the terms upper, lower, left and right (lateral), front (anterior), and rear (ventral or posterior), which indicate directions, are determined based on the relative positions between the drawings and the configurations for the convenience of explanation, not for the purpose of limitation of rights. Each direction described below is based thereon, unless otherwise specifically limited.

It will be understood that the terms "comprise", "comprising", "include", and/or "including" as used herein specify the presence of stated features or elements but do not preclude the addition of one or more other features or elements.

Sizes of components in the drawings may be exaggerated for convenience of explanation. In other words, because sizes and thicknesses of components in the drawings are arbitrarily illustrated for convenience of explanation, the following embodiments are not limited thereto.

Embodiments described herein may have aspects that are entirely hardware, partially hardware and partially software, or entirely software. As used herein, a "unit", "module", "device", or "system" refers to a computer-related entity such as hardware, a combination of hardware and software, or software. For example, as used herein, the "unit", "module", "device", or "system" is a running process, a processor, an object, an executable file, a thread of execution, a program, and/or a computer, but is not limited thereto. For example, both an application running on a computer and a computer may correspond to the unit, module, device, or system of the specification.

In the specification, the blockchain network system may be entirely hardware, or may have aspects that are partly hardware and partly software, and may be composed of one or more servers, computers, terminals, etc. The method according to an embodiment of the disclosure may be implemented in the form of a computer program for performing a series of processes, and the computer program may be recorded on a computer-readable recording medium.

Also, in the specification, a "node" is a blockchain participant, and may be a server, a personal computer, a terminal, etc., which may communicate with various electronic devices.

Also, in the specification, arbitrary data propagated on the blockchain is accumulated in a certain amount to form block data, and the formed block data is verified by nodes in the blockchain and then connected to previous block data. In addition, arbitrary data propagated to the blockchain in the specification is stored in the blockchain participating nodes, and by comparing data of each participating node periodically/aperiodically, it is possible to verify whether the data is forged or falsified.

Figure 2:
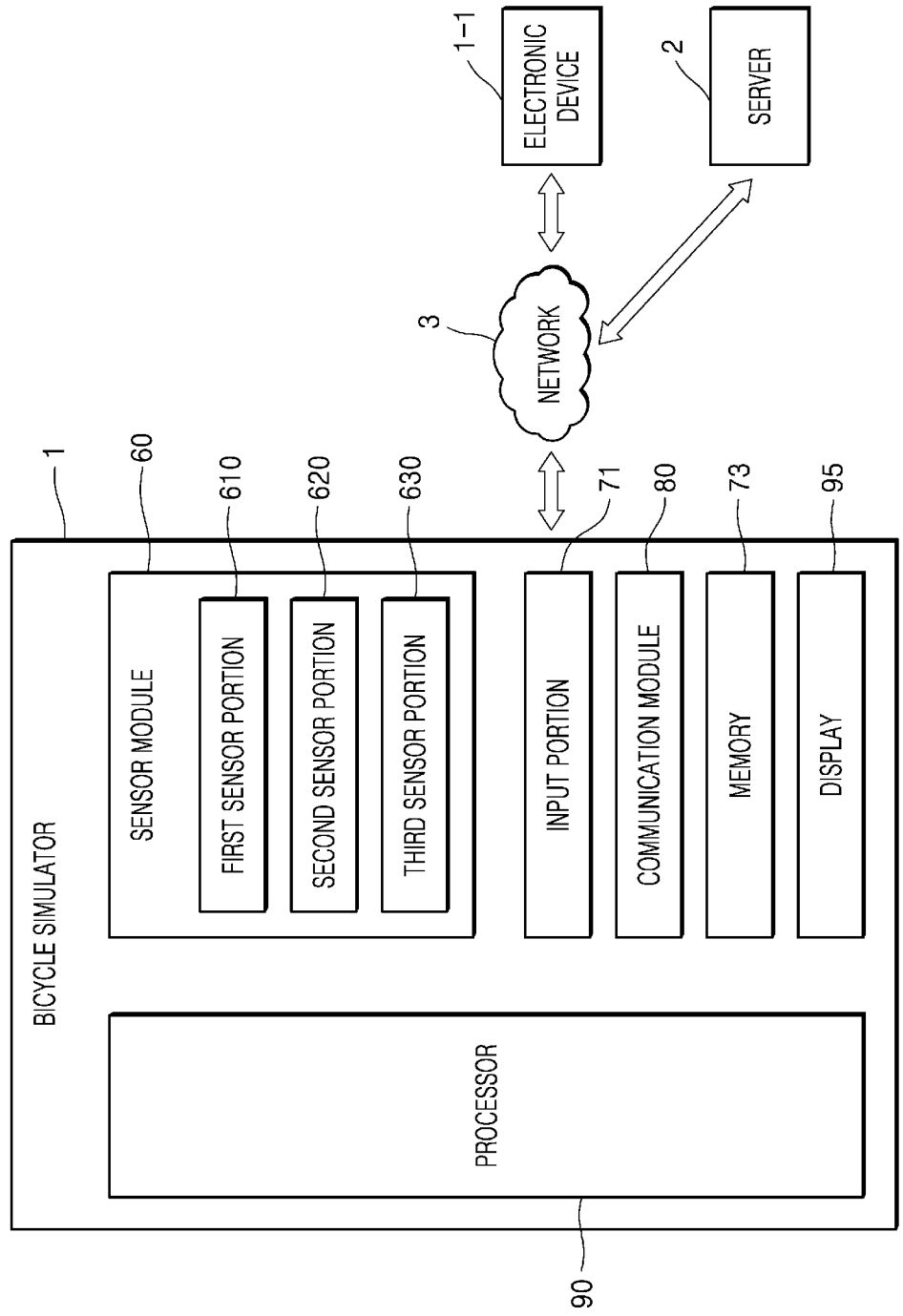
FIG. 2 is a block diagram of a bicycle simulator according to an embodiment of the disclosure.

FIG. 1 is a perspective view of a bicycle simulator according to an embodiment of the disclosure. FIG. 2 is a block diagram of a bicycle simulator according to an embodiment of the disclosure.

A bicycle simulator 1 according to the embodiment of the disclosure may allow a rider R riding a bicycle 10 supported by the bicycle simulator 1 to virtually experience the same state as an actual traveling environment, and accordingly, to enjoy realistic riding regardless of an outdoor traveling environment.

The aforementioned bicycle 10 is specially manufactured only for the bicycle simulator 1 according to the embodiment of the disclosure, and is a concept including all the bicycles 10 currently being sold by various manufacturers. The bicycle 10 may include a bicycle frame 11 forming a body of the bicycle 10, a front wheel 12 and a rear wheel 13 rotatably mounted on the bicycle frame 11, and a drive system (a crank, a chain, a transmission, etc.) that converts pedaling of the rider R into rotational force of the rear wheel 13.

The bicycle simulator 1 according to an embodiment of the disclosure may include a base portion 20, a frame support portion 30, a front wheel roller 40, a rear wheel roller 50, a sensor module 60, an input portion 71, a memory 73, a communication module 80, a processor 90, and a display 95, in order to implement the functions or operations as described above.

Hereinafter, each of the aforementioned elements will be described in detail.

Referring to FIGS. 1 and 2, the base portion 20 according to an embodiment of the disclosure is a support member fixed to the ground to support the bicycle 10. As an example, the base portion 20 may have a rectangular frame shape on which the front wheel roller 40 and the rear wheel roller 50 to be described below may be mounted. However, the disclosure is not limited thereto, and the base portion 20 may be provided as any support member on which the front wheel roller 40 and the rear wheel roller 50 may be mounted. Also, a support frame 21 to which the frame support portion 30 may be connected may be arranged in the base portion 20 according to an embodiment across both sides of the base portion 20.

The frame support portion 30 is a support member detachably coupled to the bicycle frame 11 to stably fix a position of the bicycle 10. As an example, the frame support portion 30 may be implemented as a linear rod-shaped support member extending in one direction.

A clamp device 310 may be arranged at one end of the frame support portion 30 so that one side (down tube) of the bicycle frame 11 is detachably coupled thereto. In this case, the clamp device 310 may be provided in a separable form so that one side (down tube) of the bicycle frame 11 is detachably coupled thereto. However, the disclosure is not limited thereto, and the clamp device 310 may be implemented as another type of locking device capable of supporting one side of the bicycle frame 11. The other end of the frame support portion 30 may be arranged to be movable in one direction with respect to the support frame 21 provided on the base portion 20.

The front wheel roller 40 is a cylindrical element that supports the front wheel 12 of the bicycle 10 mounted on the bicycle simulator 1 and rotates together with rotation of the front wheel 12, and both ends thereof may be rotatably connected to the base portion 20 so as to freely rotate forward or backward with respect to the mounted bicycle 10.

The rear wheel roller 50 is a cylindrical element that supports the rear wheel 13 of the bicycle 10 mounted on the bicycle simulator 1 and rotates together with rotation of the rear wheel 13, and both ends thereof may be rotatably connected to the base portion 20 so as to freely rotate forward or backward with respect to the mounted bicycle 10.

The sensor module 60 is a sensing device for sensing a traveling state of the bicycle 10 mounted on the bicycle simulator 1. As an example, the sensor module 60 may include a first sensor 610 capable of sensing a traveling direction of the bicycle 10, a second sensor 620 capable of sensing a traveling speed and a traveling distance of the bicycle 10, and a third sensor 630 capable of sensing whether or not the bicycle 10 is being rotatably driven. Matters related to sensing of a traveling state of the bicycle 10 by using the sensor module 60 will be described in more detail with reference to FIGS. 4A to 11.

The input portion 71 may receive a command of the rider R for controlling the bicycle simulator 1, body information of the rider R, and the like. For example, an input of the input portion 71 may include an input for manipulating a button, a keypad, a mouse, a trackball, a jog switch, a knob, or the like, an input for touching a touch pad or a touch screen, a voice input, a motion input, a biometric information input (e.g., iris recognition, fingerprint recognition, or the like), or the like, but is not limited thereto.

The memory 73 may store various types of data used by at least one element (e.g., the processor 90 or the sensor module 60) of the bicycle simulator 1, for example, software and input data or output data for commands related thereto. The memory 73 may include a volatile memory or a nonvolatile memory.

The communication module 80 may support establishment of a wired or wireless communication channel between the bicycle simulator 1 and an external electronic device (e.g., another bicycle simulator 1-1 or a server 2) and communication through the established communication channel. The communication module 80 may include one or more communication processors that operate independently from the processor 90 (e.g., an application processor) and support wired communication or wireless communication. According to an embodiment, the communication module 80 may include a wireless communication module (e.g., a cellular communication module, a short-range wireless communication module, or a global navigation satellite system (GNSS) communication module) or a wired communication module (e.g., a local area network (LAN) communication module or a power line communication module), and may communicate with an external electronic device through a network 3 (e.g., a short-range communication network such as Bluetooth, Wi-Fi direct, or infrared data association (IrDA), a cellular network, the Internet, or a remote communication network such as a computer network (e.g., a LAN or a wide area network (WAN)) by using a corresponding communication module among the communication modules. Various types of the communication module 80 described above may be implemented as one chip or as separate chips.

The processor 90 may drive, for example, software to control at least one another element (e.g., a hardware or software element) connected to the processor 90, and may perform various data processings and operations. The processor 90 may load commands or data received from another element (e.g., the sensor module 60 or the communication module 80) into the memory 73, for example, a volatile memory, and store result data in the memory 73, for example, a nonvolatile memory.

The display 95 is an element that visually transmits, to the rider R, a traveling environment, an operating system program, or the like for a course of a bicycle competition or the like, and may be a curved display having a size that covers all front viewing angles of the rider R, or a goggle-type display (not shown) worn by the rider R, as illustrated in FIG. 1. As an example, objects such as another rider R, an obstacle, and the like, as well as bicycle traveling paths may be variously displayed on the display 95.

Figure 3A:
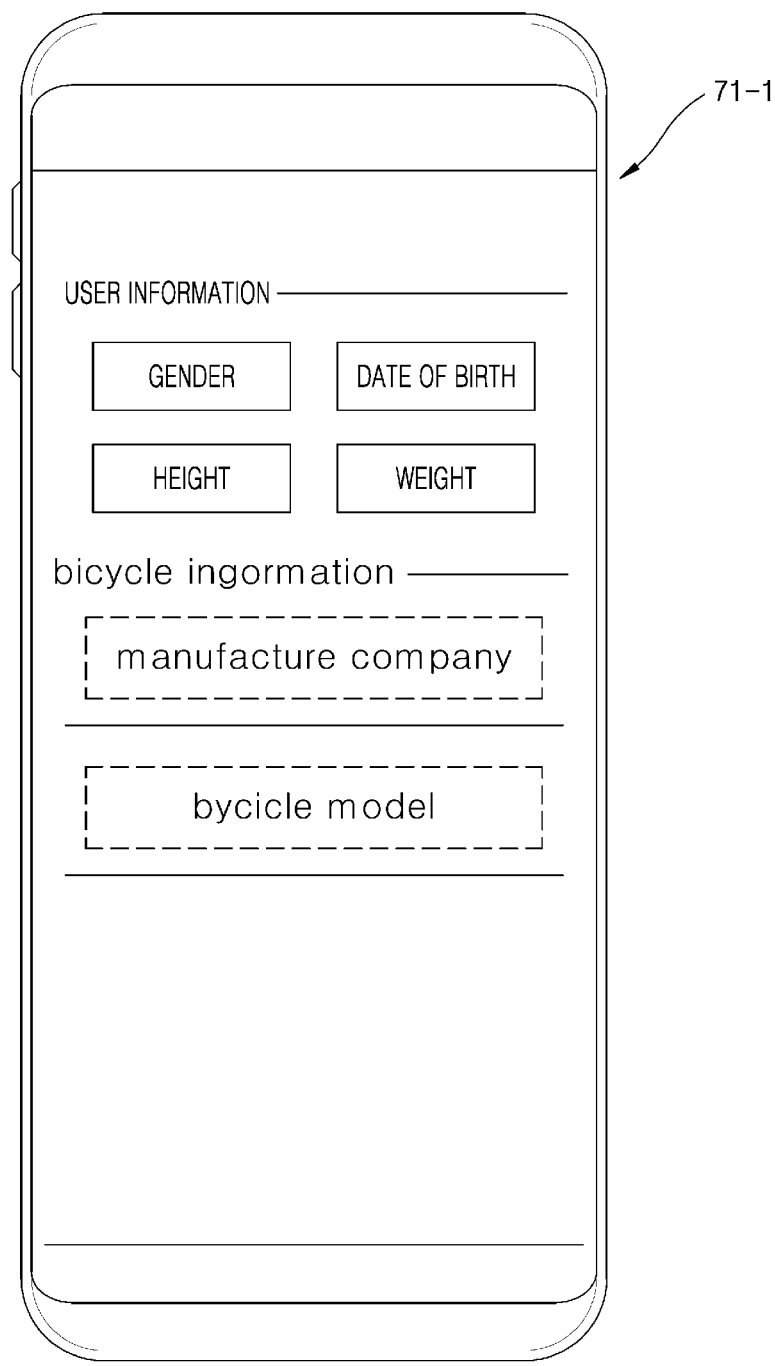
FIG. 3A is a schematic diagram of an input portion according to an embodiment.
Figure 3B:
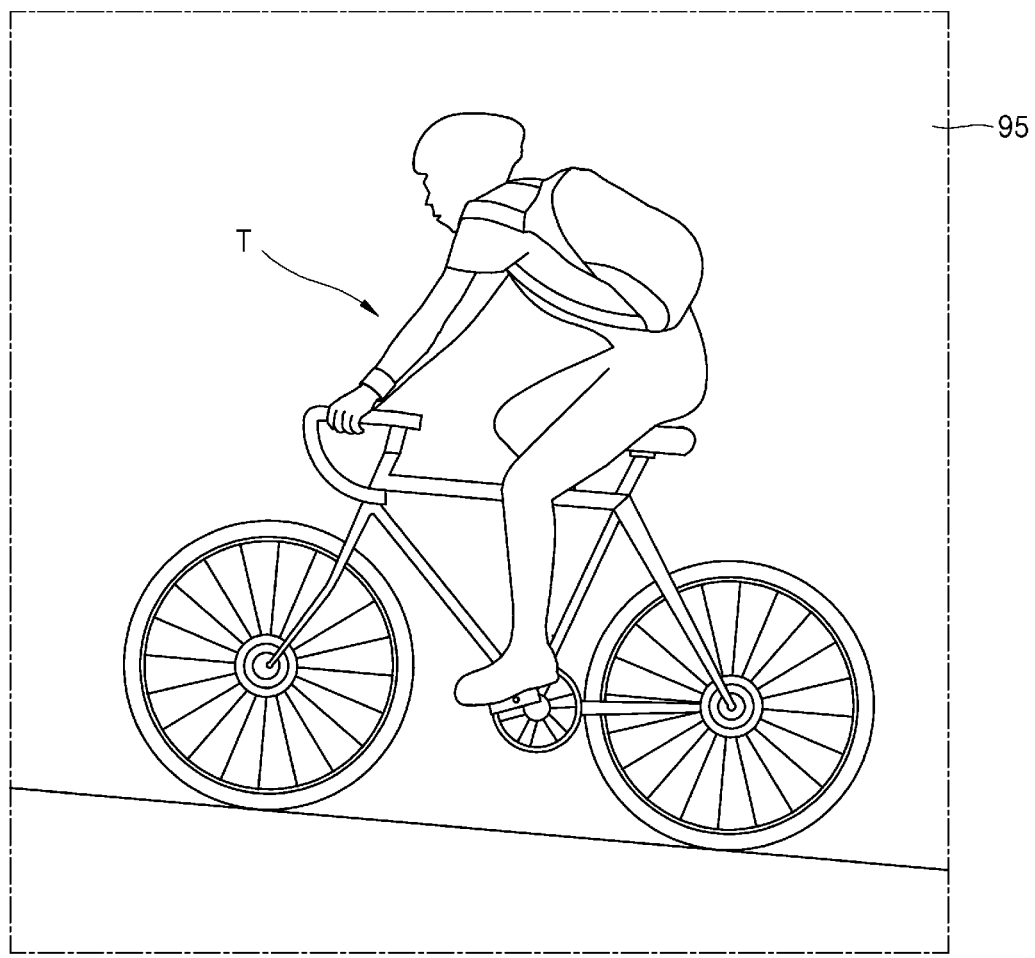
FIG. 3B is a display screen for displaying a bicycle avatar according to an embodiment.

FIG. 3A is a schematic diagram of an input portion according to an embodiment. FIG. 3B is a display screen for displaying a bicycle avatar according to an embodiment.

Referring to FIGS. 2, 3A, and 3B, the input portion 71 according to an embodiment may receive a command of the rider R for controlling the bicycle simulator 1 and body information of the rider R, for example, information such as gender, age, height, race, hair color, weight, and the like. In addition, the input portion 71 according to an embodiment may receive an input of a model of the bicycle 10 mounted on the bicycle simulator 1. Also, in the bicycle simulator 1 according to an embodiment, a weight measurement portion (not shown) is arranged under the frame support portion 30 so that the body information of the rider R may be obtained without an input by using the input portion 71.

In an embodiment, the input portion 71 may include an input for manipulating a button, a keypad, a mouse, a trackball, a jog switch, a knob, or the like, which are formed as one body with the bicycle simulator 1, an input for touching a touch pad or a touch screen, a voice input, a motion input, a biometric information input (e.g., iris recognition, fingerprint recognition, or the like), or the like. Also, the input portion 71 according to an embodiment may be implemented as a mobile phone 71-1 of a user as illustrated in FIG. 3A. The mobile phone 71-1 of the user may be connected to the communication module 80 and may transmit information input from the user to the processor 90.

The memory 73 may store, according to types, shapes of a person and a bicycle corresponding to the body information of the rider R input through the input portion 71, the model of the bicycle 10, and body information of the rider R sensed by other sensing portions. Accordingly, as illustrated in FIG. 3B, the processor 90 may implement, on the display 95, a bicycle avatar T including a shape of a person and a shape of a bicycle corresponding to the body information of the rider R and the model of the bicycle 10. In the specification, the bicycle avatar T is defined as a shape that corresponds to the rider R using the bicycle simulator 1 and the bicycle 10 mounted on the bicycle simulator 1 and is displayed on the display 95. As described above, because the bicycle avatar T corresponding to the rider R and the bicycle 10 is formed in cyberspace, the user may virtually experience the same state as an outdoor traveling environment even indoors, and thus the rider may enjoy more realistic riding even indoors.

Figure 4A:
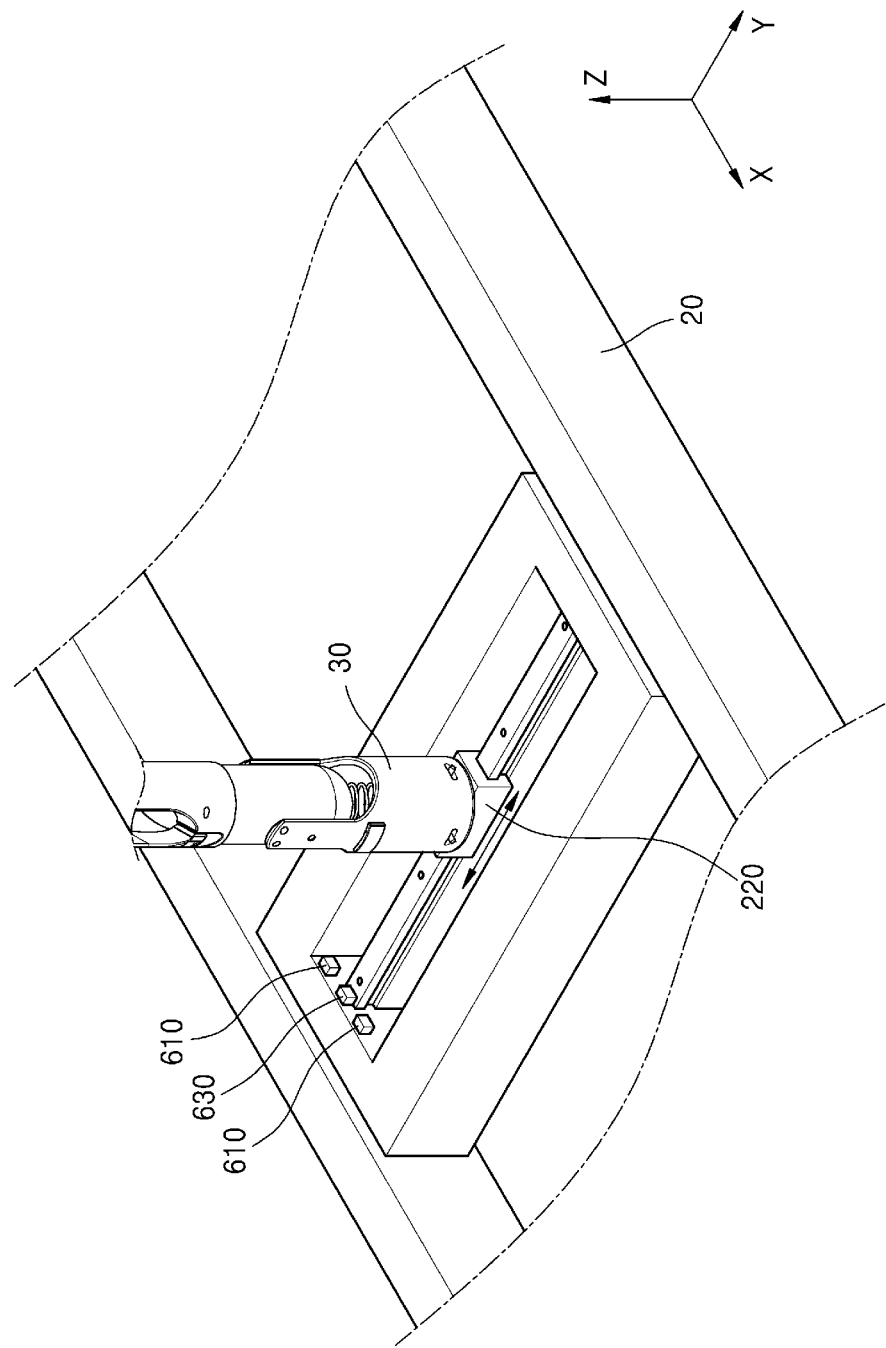
FIG. 4A is a partial perspective view of a bicycle simulator according to an embodiment.
Figure 4B:
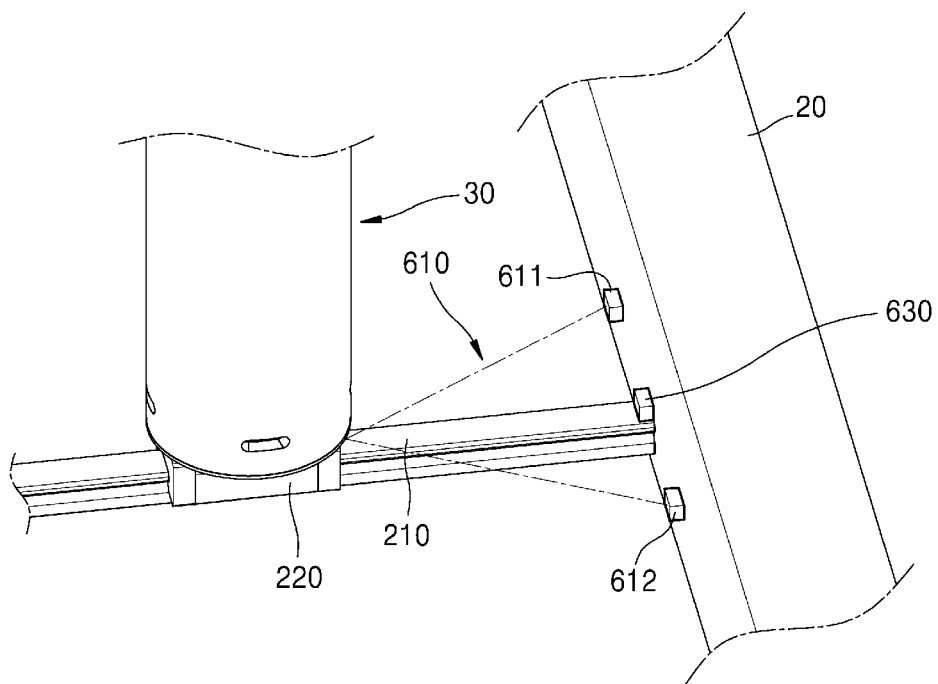
FIG. 4B is an enlarged view of a bicycle simulator according to an embodiment.

FIG. 4A is a partial perspective view of a bicycle simulator according to an embodiment. FIG. 4B is an enlarged view of a bicycle simulator according to an embodiment.

As illustrated in FIG. 1, a frame 11 of the bicycle mounted on the bicycle simulator 1 according to an embodiment is supported by a frame support portion 30. When the traveling direction of the bicycle 10 mounted on the bicycle simulator 1 changes, the frame 11 of the bicycle and the frame support portion 30 supported by the frame 11 of the bicycle may move left and right in a first direction Y. Therefore, when a moving direction and a moving distance of the frame support portion 30 in the first direction Y are sensed, changes in the traveling direction and the traveling path of the bicycle 10 may be identified. Hereinafter, a method of identifying changes in the traveling direction and the traveling path of the bicycle 10 by using the first sensor 610 capable of sensing the moving direction and the moving distance of the frame support portion 30 in the first direction Y will be described in more detail.

Referring to FIGS. 4A and 4B, the bicycle simulator 1 according to an embodiment may further include a slide guide 210 between both sides of the base portion 20, a slide portion 220 fixed to one end of the frame support portion 30 and connected to be movable along the slide guide 210, and the first sensor 610 capable of sensing a moving direction and a moving distance of the slide portion 220.

The slide guide 210 may be formed as a slide rail extending in the first direction Y. For example, the slide guide 210 may be arranged to be fixed between both sides of the base portion 20. The slide portion 220 may be fixed to one end of the frame support portion 30 and may move together with the frame support portion 30 in the first direction Y. Accordingly, the first sensor 610 may sense a movement of the frame support portion 30 in the first direction Y by sensing may sense a movement of the slide portion 220 in the first direction Y. In this case, the slide portion 220 may be arranged to be insertable into the slide guide 210, and accordingly, the slide portion 220 may move along the slide guide 210.

The first sensor 610 may be a distance sensor capable of sensing and tracking a movement interval generated due to the movement of the slide portion 220 along the slide guide 210. For example, the first sensor 610 may be a time-of-flight (ToF) sensor which is a kind of distance sensor. For example, when the first sensor 610 is implemented as a ToF sensor, the first sensor 610 may include a light source 611 that emits a certain amount of light, and a light receiving portion 612 that detects a reflected light that is reflected and returns from a part of the slide portion 220 by the light emitted from the light source 611. In the aforementioned embodiment, the ToF sensor is disclosed as an example of the first sensor 610, but the disclosure is not limited thereto. The first sensor 610 according to an embodiment may be implemented as any sensing device capable of sensing and tracking a movement interval of the slide portion 220 with respect to the base portion 20.

According to an embodiment, the first sensor 610 may be arranged to be fixed to one or more of both sides of the base portion 20. Accordingly, the first sensor 610 may sense the moving distance and the moving direction of the slide portion 220 with respect to the base portion 20. The traveling direction of the bicycle 10 may be sensed according to the moving direction of the slide portion 220 sensed by the first sensor 610, and a traveling position of the bicycle 10 may be sensed according to the moving distance of the slide portion 220 sensed by the first sensor 610. Hereinafter, a change in the traveling direction of the bicycle 10 and a technical feature in which a traveling direction of the bicycle avatar displayed on the display 95 changes by sensing the change will be described with reference to FIGS. 5A to 6B.

Figure 5A:
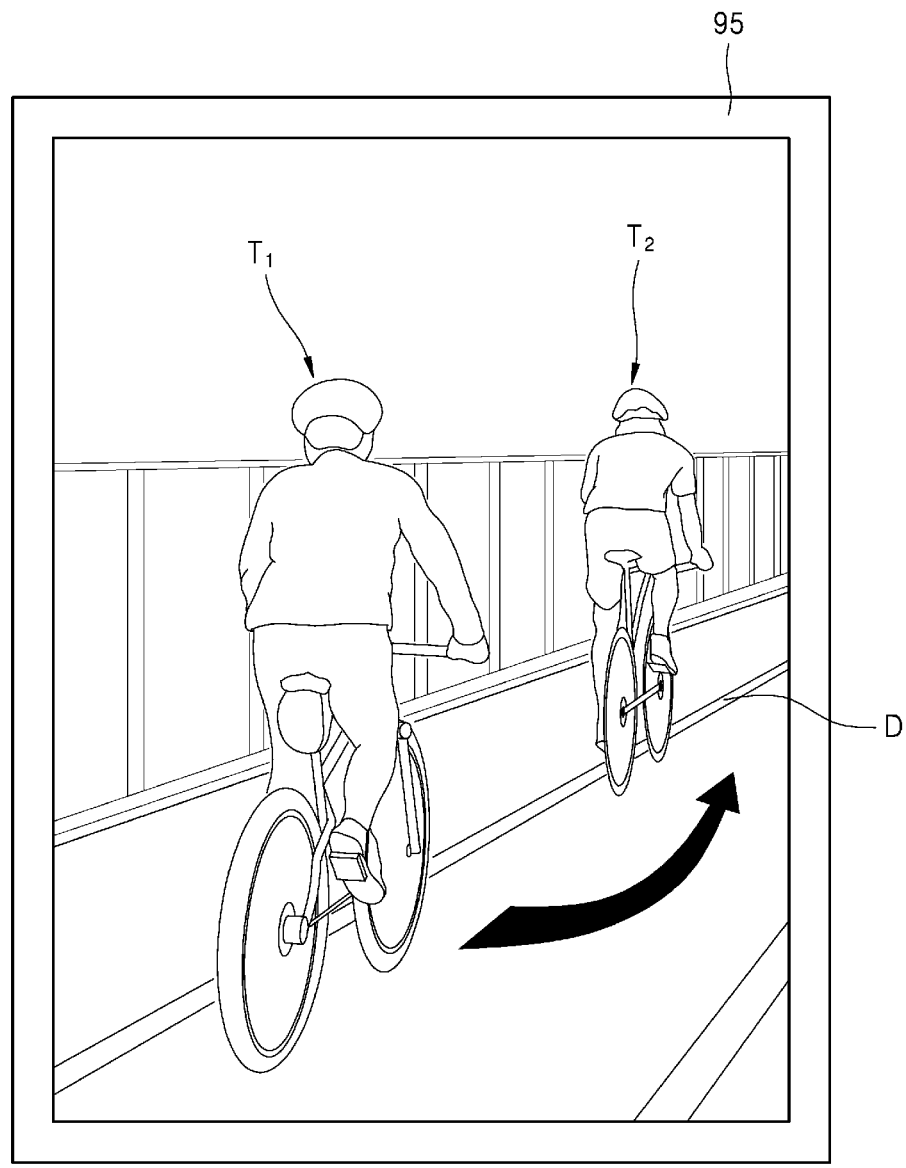
FIGS. 5A and 5B are display screens for displaying a change in a traveling path of a bicycle avatar according to a change in a traveling path of a bicycle.
Figure 5B:
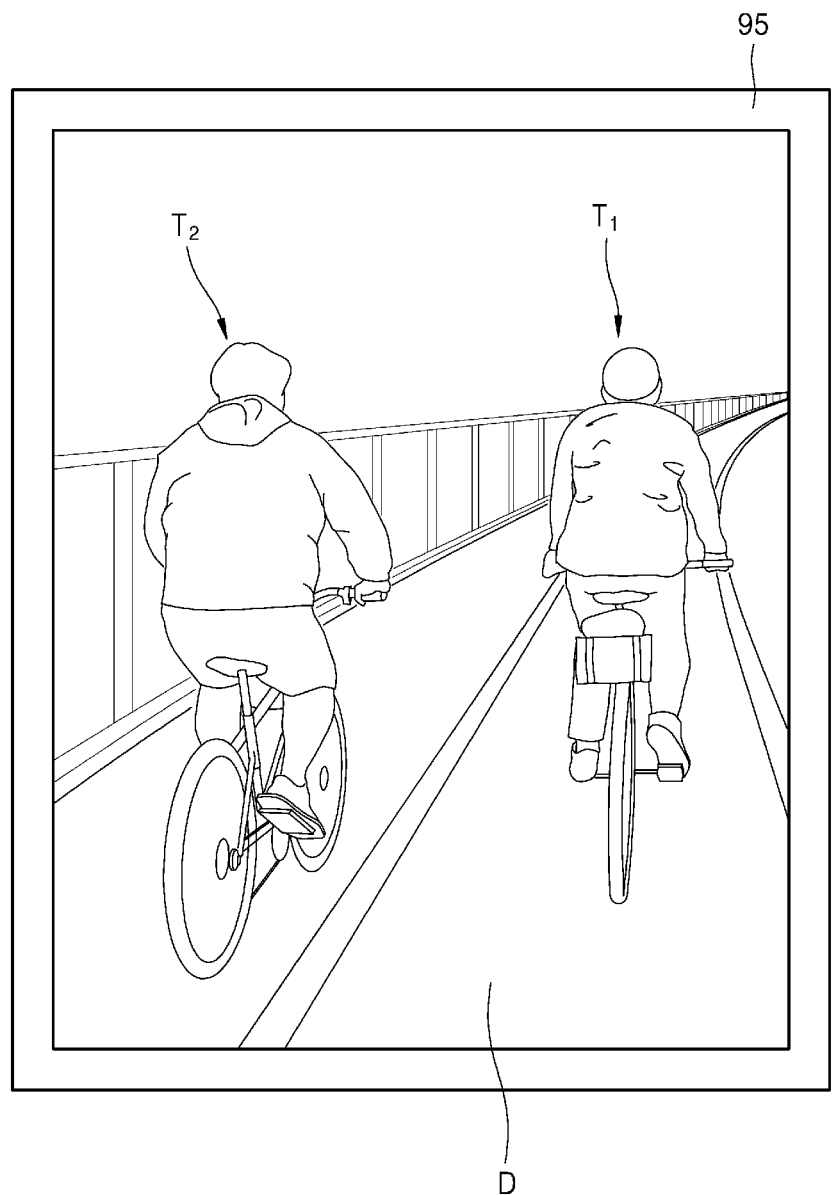
Figure 6A:
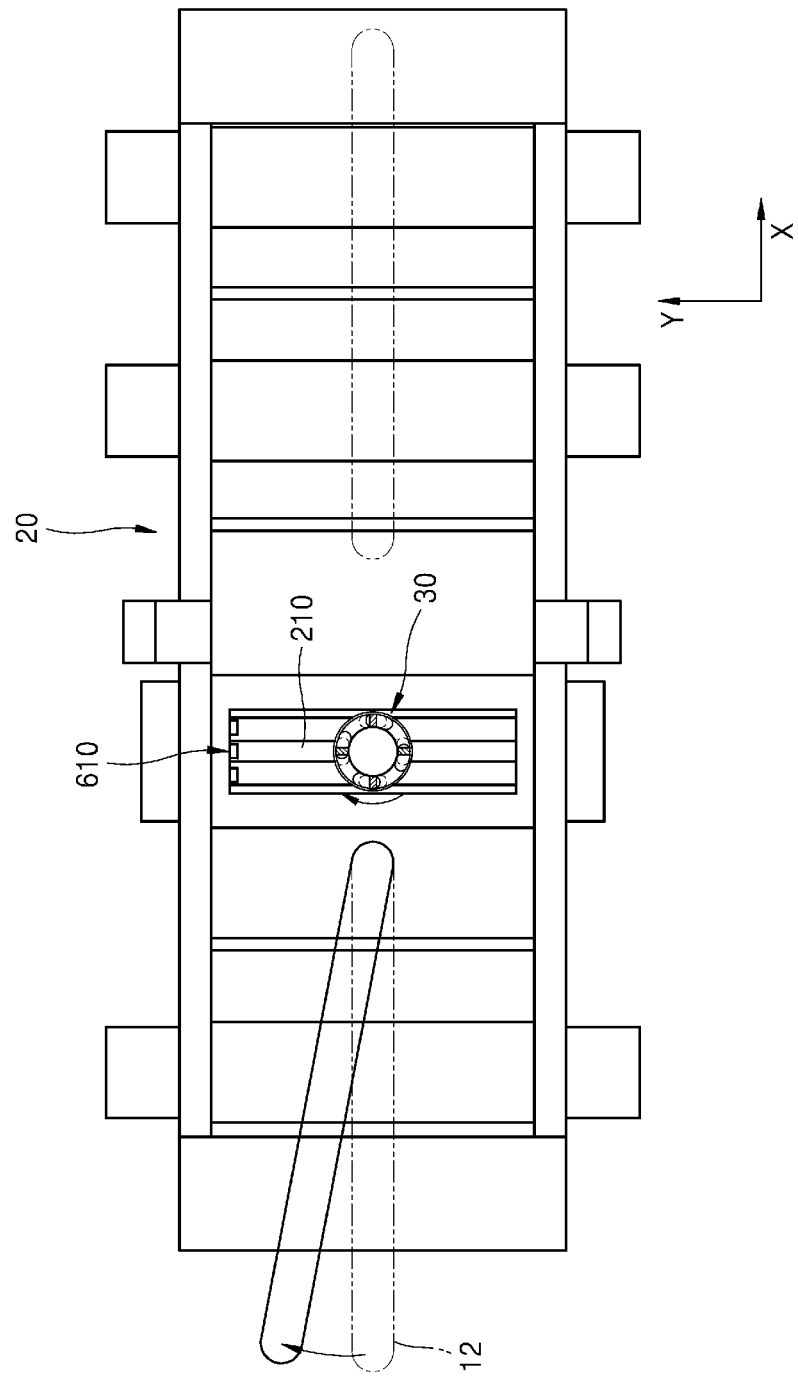
FIGS. 6A and 6B are plan schematic views of a bicycle simulator according to steering of a bicycle.
Figure 6B:
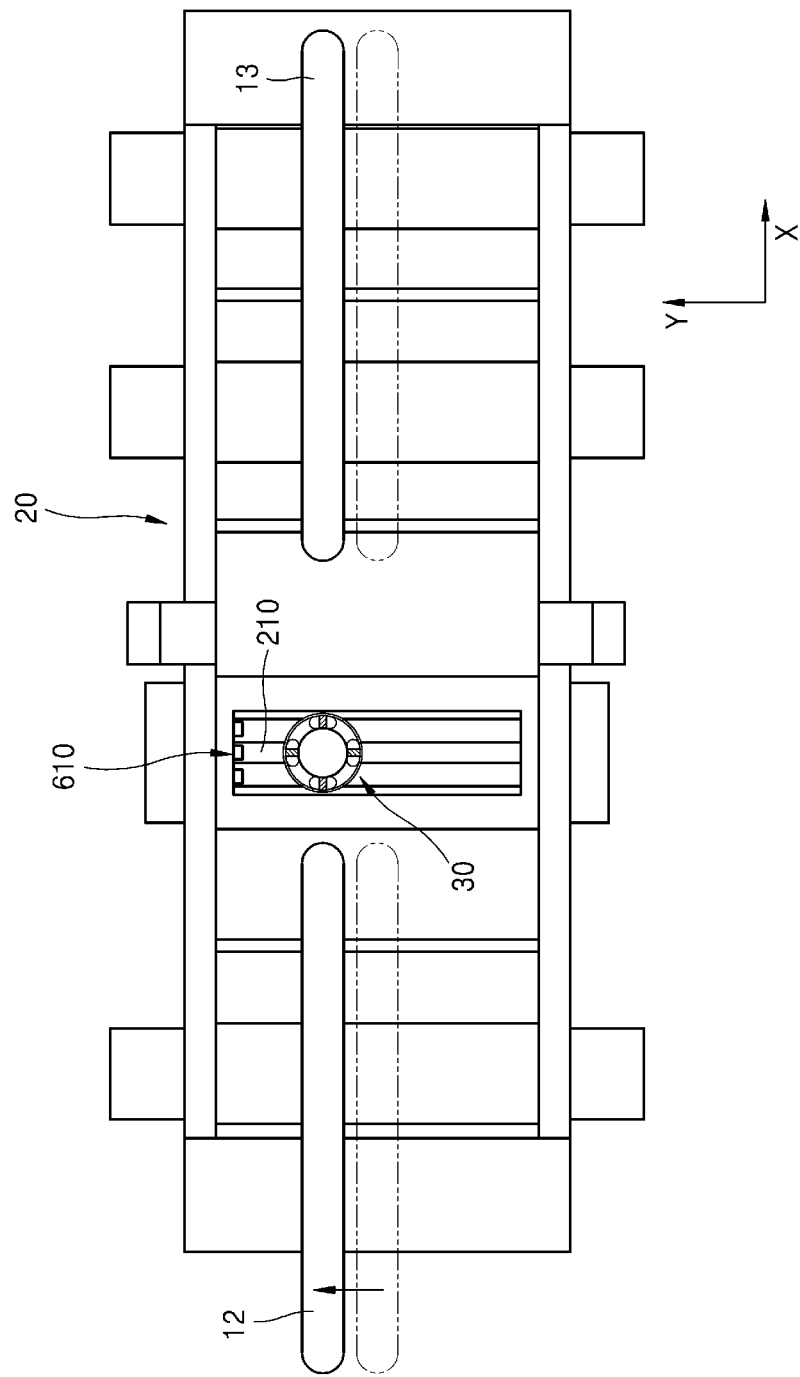

FIGS. 5A and 5B are display screens for displaying a change in a traveling path of a bicycle avatar according to a change in a traveling path of a bicycle. FIGS. 6A and 6B are plan schematic views of a bicycle simulator according to steering of a bicycle.

Referring to FIG. 5A, a first bicycle avatar $T_1$ for the bicycle 10 mounted on the bicycle simulator 1 and the rider R using the bicycle may be displayed on the display 95 according to an embodiment. In this case, as illustrated in FIG. 2, the display 95 may display a second bicycle avatar $T_2$ riding the bicycle simulator 1-1 connected from another space by using the network 3. Accordingly, a plurality of riders located in different spaces share the same bicycle riding experience by using the bicycle simulators 1 and 1-1, so that the riders may be provided with a more realistic and interesting virtual riding environment.

As an example, when the second bicycle avatar $T_2$ and the first bicycle avatar $T_1$ travel in parallel in a row, the rider R corresponding to the first bicycle avatar $T_1$ may increase the speed to overtake the second bicycle avatar $T_2$. In this case, when the rider R travels at an increased speed in the same direction, the rider R may collide with the second bicycle avatar $T_2$. In order to prevent a collision with the second bicycle avatar $T_2$, the rider R may change the traveling path as illustrated in FIG. 5A, for example, from a traveling road D to the right, and then, the first bicycle avatar $T_1$ may ride the bicycle through a traveling path different from that of the second bicycle avatar $T_2$ as illustrated in FIG. 5B.

As described above, the first sensor 610 according to an embodiment may recognize a change in the traveling direction of the bicycle 10 mounted on the bicycle simulator 1 and change the traveling direction of the first bicycle avatar $T_1$ displayed on the display 95, by sensing a movement of the frame support portion 30, more specifically, the slide portion 220 that supports the frame support portion 30 and moves together in the first direction Y.

As an example, referring back to FIG. 1, when the rider R riding the bicycle simulator according to an embodiment of the disclosure changes the traveling direction of the bicycle 10 to the right, the front wheel 12 may rotate in a clockwise direction as illustrated in FIG. 6A. Thereafter, the frame support portion 30 may be moved to the right in the first direction Y along a moving direction of the front wheel 12. Thereafter, the rear wheel 13 may move along the moving direction of the frame support portion 30, and the position of the bicycle 10 may move with respect to the base portion 20 in the state as illustrated in FIG. 6B. In this case, as illustrated in FIG. 4B, the first sensor 610 fixed to the base portion 20 may sense a movement change of the frame support portion 30 with respect to the base portion 20 in the first direction Y.

As an example, when the frame support portion 30 moves to the right in the first direction Y in the moving direction of the front wheel 12 after the front wheel 12 rotates in the clockwise direction, the slide portion 220 fixed to the frame support portion 30 may also move to the right in the first direction Y with respect to the base portion 20. In this case, the first sensor 610 may sense that the slide portion 220 moves to the right in the first direction Y, and accordingly, may sense that the traveling direction of the bicycle 10 changes to the right.

Also, the first sensor 610 may sense a changed traveling path when a movement state in which the slide portion 220 moves to the right in the first direction Y is completed. As an example, when the movement of the slide portion 220 is completed as illustrated in FIG. 6B, the first sensor 610 may sense the moving distance of the slide portion 220, and the processor 90 may recognize the changed traveling path as illustrated in FIG. 5B and display the first bicycle avatar $T_1$ on a traveling path different from the second bicycle avatar $T_2$.

Therefore, a change in the traveling direction of the rider R riding the bicycle 10 and a change in the traveling path accordingly may be sensed in real time by the first sensor 610, and a change in the traveling direction and the traveling path of the first bicycle avatar $T_1$ corresponding to the change in the traveling direction and the traveling path of the bicycle 10 may also be reflected in real time and implemented on the display 95.

Figure 7:
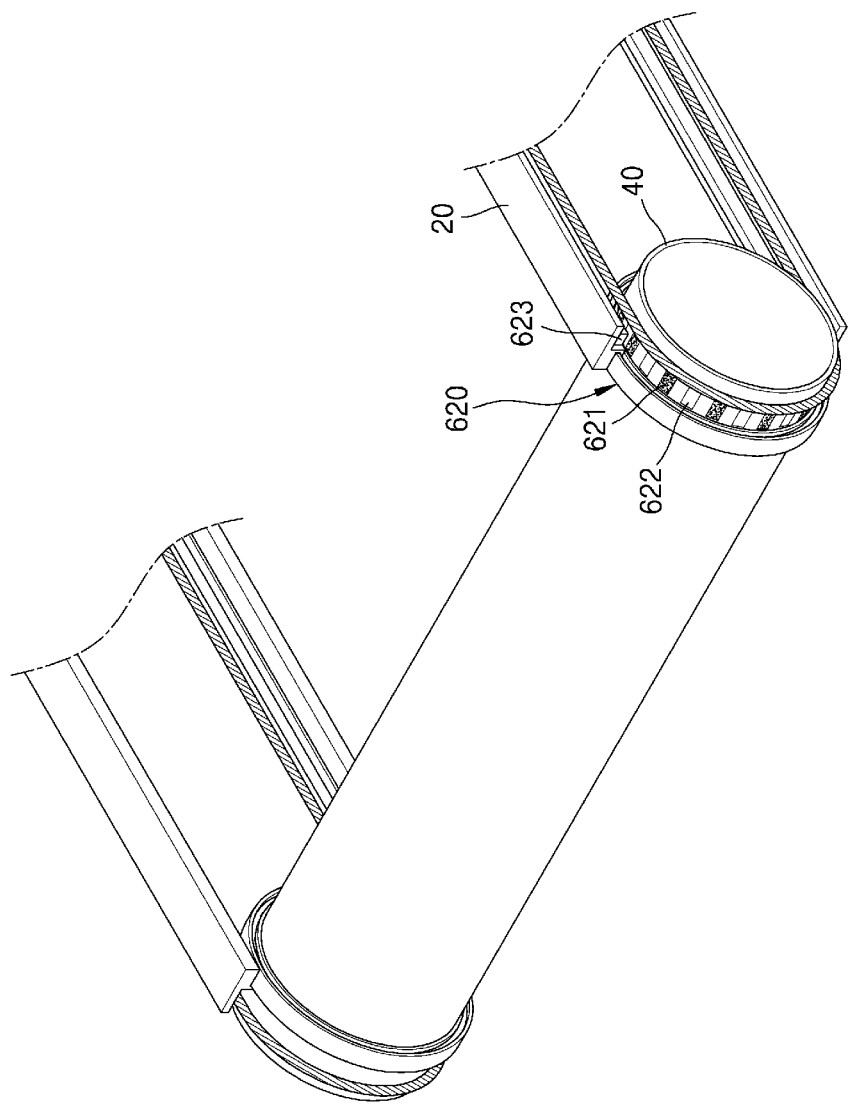
FIG. 7 is a partial perspective view of a bicycle simulator according to an embodiment.
Figure 8A:
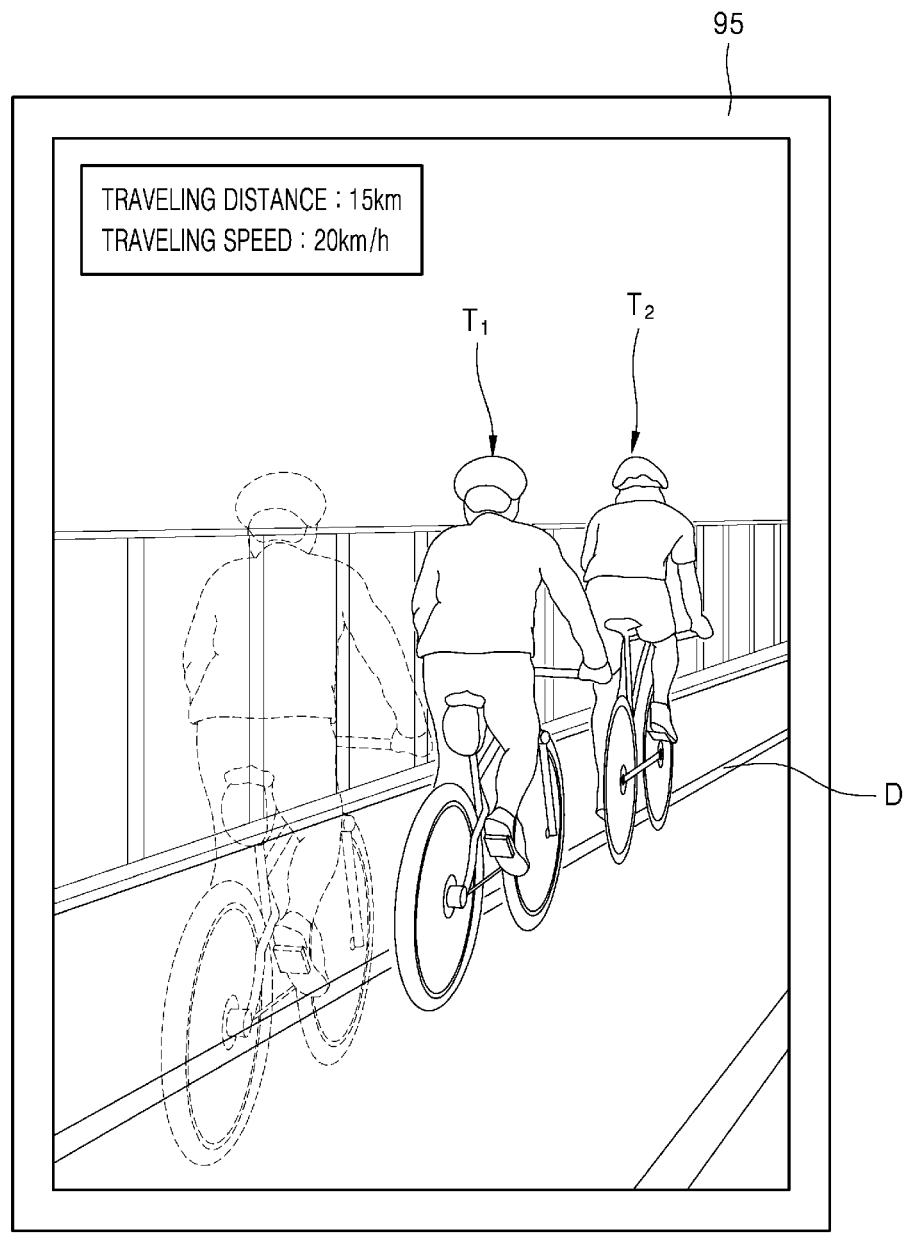
FIG. 8A is a display screen for displaying a change in a traveling path of a bicycle avatar according to a change in a traveling speed of a bicycle.
Figure 8B:
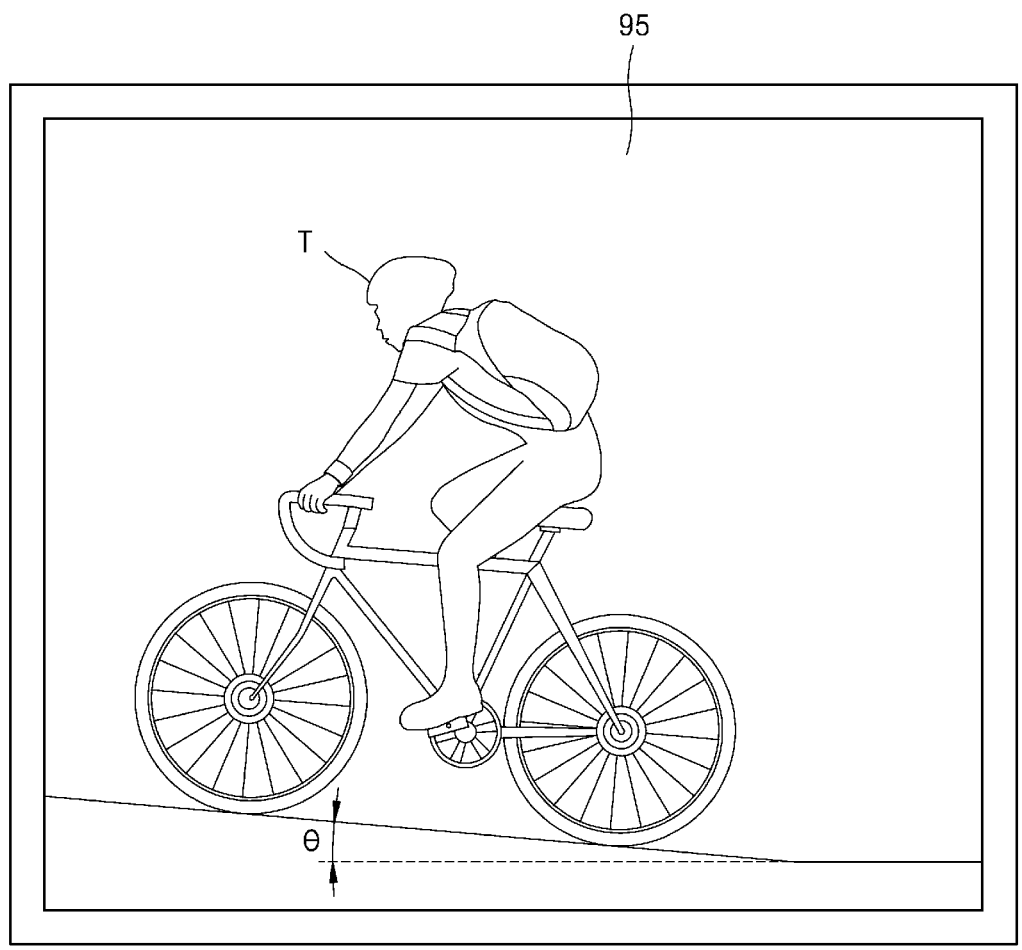
FIG. 8B is a display screen for displaying a bicycle avatar traveling on an inclined traveling road, according to an embodiment.

FIG. 7 is a partial perspective view of a bicycle simulator according to an embodiment. FIG. 8A is a display screen for displaying a change in a traveling path of a bicycle avatar according to a change in a traveling speed of a bicycle. FIG. 8B is a display screen for displaying a bicycle avatar traveling on an inclined traveling road, according to an embodiment.

As illustrated in FIG. 1, the front wheel 12 and the rear wheel 13 of the bicycle mounted on the bicycle simulator 1 according to an embodiment are supported by the front wheel roller 40 and the rear wheel roller 50, respectively. Because the front wheel roller 40 and the rear wheel roller 50 may also rotate as the front wheel 12 and the rear wheel 13 rotate, when a rotation speed and a rotation distance of the front wheel 12 and the rear wheel 13 of the bicycle 10 mounted on the bicycle simulator 1 change, a rotation speed and the rotation distance of the front wheel roller 40 and a rear wheel roller 50 may also change. Therefore, when the rotation speed and the rotation distance of the front wheel roller 40 and the rear wheel roller 50 are sensed, the traveling speed and the traveling distance of the bicycle 10 may be identified. Hereinafter, a method of identifying changes in the traveling speed and the traveling distance of the bicycle 10 by using the second sensor 620 capable of sensing a rotation speed and a rotation distance of at least one of the front wheel roller 40 and the rear wheel roller 50 will be described in more detail.

Referring to FIG. 7, the bicycle simulator 1 according to an embodiment may further include the second sensor 620 capable of sensing the rotation speed and the rotation distance of at least one of the front wheel roller 40 and the rear wheel roller 50.

The second sensor 620 according to an embodiment of the disclosure may be implemented as a magnetic encoder including a magnetic flux sensor, and may include a plurality of permanent magnets 621 and 622 and a rotation speed sensing portion 623. For example, the permanent magnets 621 and 622 having different poles are alternately magnetized along the outer circumferential surface of the front wheel roller 40. In this case, the permanent magnets 621 and 622 may be formed as an integral type in which half of the front wheel roller 40 is formed as an N-pole and the other half is formed as an S-pole, or may be formed as a plurality of independent permanent magnets arranged at regular intervals along the outer circumferential surface of the front wheel roller 40. As an example, the second sensor 620 may sense magnetic flux interlinkage of the permanent magnets 621 and 622 with respect to the rotation speed sensing portion 623 that regularly changes as the front wheel roller 40 rotates, and output an electrical signal. Thereafter, the output signal may be applied to the processor 90 to sense the rotation speed and the rotation distance of the front wheel roller 40. In an embodiment of the disclosure, the second sensor 620 is exemplified as a magnetic encoder including a magnetic flux sensor, but the disclosure is not limited thereto. For example, the second sensor 620 may be implemented as an optical encoder including a light source and a light receiving portion, and in this case, a reflective member capable of reflecting light incident from the light source may be arranged on the outer circumferential surface of the front wheel roller 40. Also, the second sensor 620 according to an embodiment may be arranged in the rear wheel roller 50 as well as the front wheel roller 40, or may be arranged in the front wheel roller 40 and the rear wheel roller 50.

As described above, the second sensor 620 may sense the rotation speed and rotation distance of at least one of the front wheel roller 40 and the rear wheel roller 50 and transmit the same to the processor 90, and the processor 90 may calculate the traveling speed and the traveling distance of the bicycle 10 from circumferential sizes of the front wheel 12 and the rear wheel 13 and the number of rotations of the front wheel 12 and the rear wheel 13 per unit time.

Referring to FIG. 8A, the first bicycle avatar $T_1$ and the second bicycle avatar $T_2$ may be displayed together on the display 95 according to an embodiment. Matters related to the first bicycle avatar $T_1$ and the second bicycle avatar $T_2$ are substantially the same as those described with reference to FIGS. 5A and 5B, and thus, descriptions thereof will be omitted.

As an example, when the second bicycle avatar $T_2$ and the first bicycle avatar $T_1$ travel in parallel in a row, a distance between the first bicycle avatar $T_1$ and the second bicycle avatar $T_2$ that are adjacent to each other may be displayed differently according to the traveling speed of the bicycle 10 corresponding to the first bicycle avatar $T_1$ and the second bicycle avatar $T_2$. For example, when the traveling speed of the bicycle 10 corresponding to the first bicycle avatar $T_1$ is faster than the traveling speed of the bicycle 10 corresponding to the first bicycle avatar $T_1$ by the second sensor 620, the first bicycle avatar T1 may be displayed on the display 95 to be more adjacent to the second bicycle avatar T2. In addition, in order to identify the amount of exercise of the rider R, the display 95 may display the current traveling speed and traveling distance of the bicycle 10 in real time.

Referring to FIG. 8B, the bicycle avatar T arranged on an inclined traveling road having a certain inclination angle θ may be displayed on the display 95 according to an embodiment. As an example, when the bicycle avatar T travels on an uphill road having the certain inclination angle θ, a traveling state of the bicycle avatar T traveling on the uphill road may be displayed differently according to the traveling speed of the bicycle 10 corresponding to the bicycle avatar T.

For example, in a case where the traveling road changes from the flat ground to the uphill road having the certain inclination angle θ on the display 95, when the rotation speed of the front wheel roller 40 and the rear wheel roller 60 sensed by the second sensing portion 620 on the flat ground is faster than the rotation speed of the front wheel roller 40 and the rear wheel roller 60 sensed by the second sensing portion 620 on the uphill road, the bicycle avatar T may be displayed to ascend the uphill road on the display 95. However, when the rotation speed of the front wheel roller 40 and the rear wheel roller 60 sensed by the second sensing portion 620 on the uphill road is slower than the rotation speed of the front wheel roller 40 and the rear wheel roller 60 sensed by the second sensing portion 620 on the flat ground, the bicycle avatar T may be displayed on the display 95 not to ascend the uphill road or to be pushed backward.

In addition, for example, in a case where the traveling road changes from the flat ground to a downhill road having a certain inclination angle (not shown) on the display 95, even when the rotation speed of the front wheel roller 40 and the rear wheel roller 60 sensed by the second sensing portion 620 on the flat ground is the same as the rotation speed of the front wheel roller 40 and the rear wheel roller 60 sensed by the second sensing portion 620 on the downhill area, the bicycle avatar T may be displayed to descend the downhill road at a faster speed on the display 95. As described above, by sensing the traveling speed of the bicycle 10 by using the second sensor 620 and reflecting the same on the display 95, the user may experience the same traveling experience as traveling on an actual inclined traveling road without traveling on an inclined traveling road having an actual inclined angle.

Figure 9:
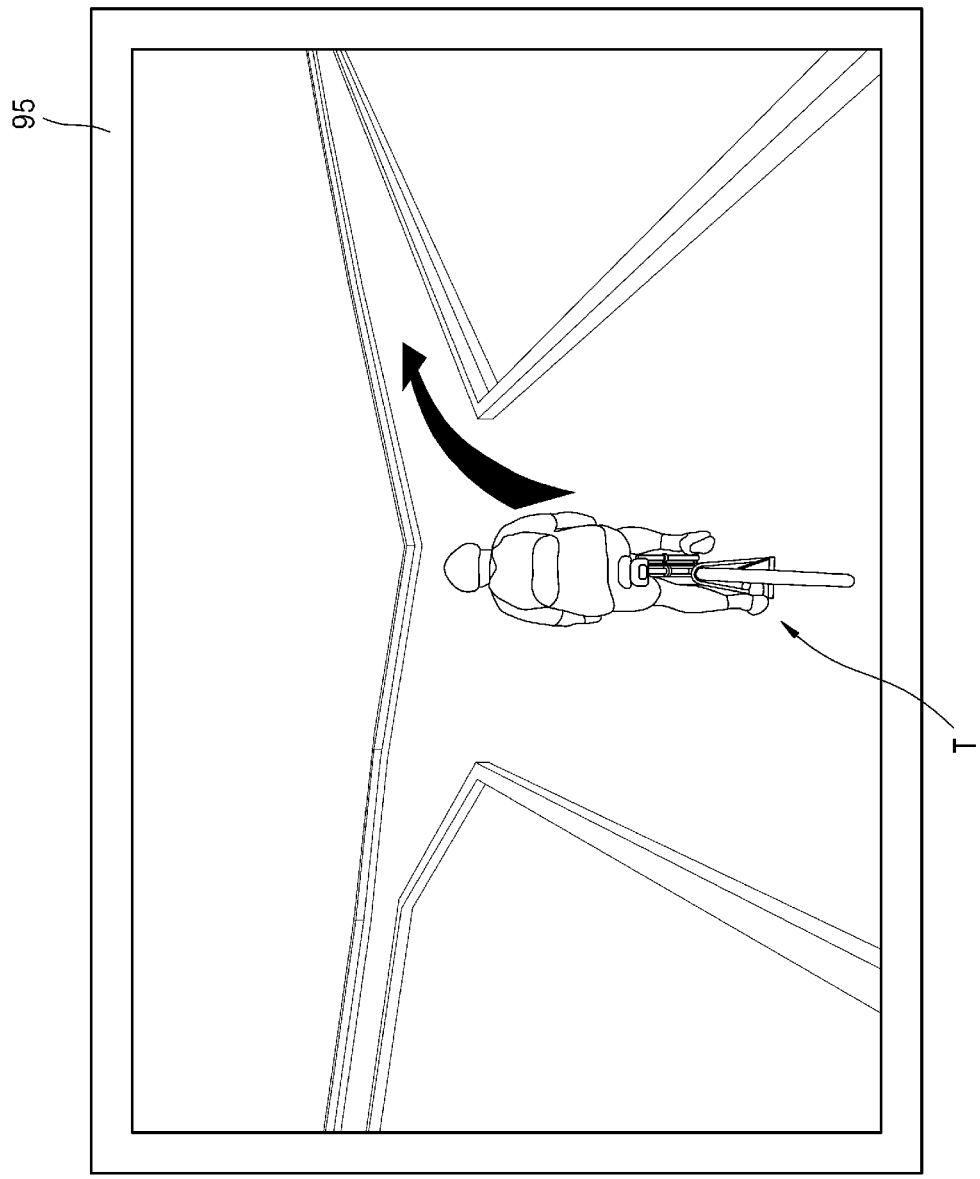
FIG. 9 is a display screen for displaying a change in a traveling path of a bicycle avatar, according to an embodiment.
Figure 10:
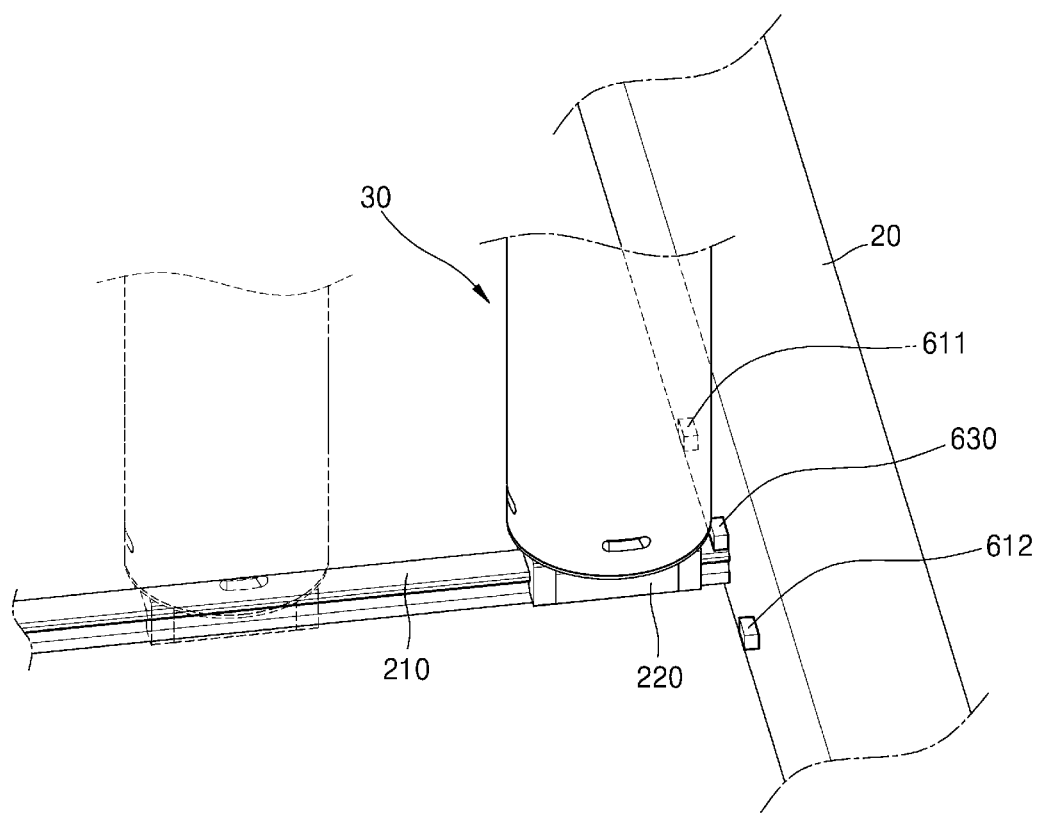
FIG. 10 is a partial perspective view of a bicycle simulator according to an embodiment.
Figure 11:
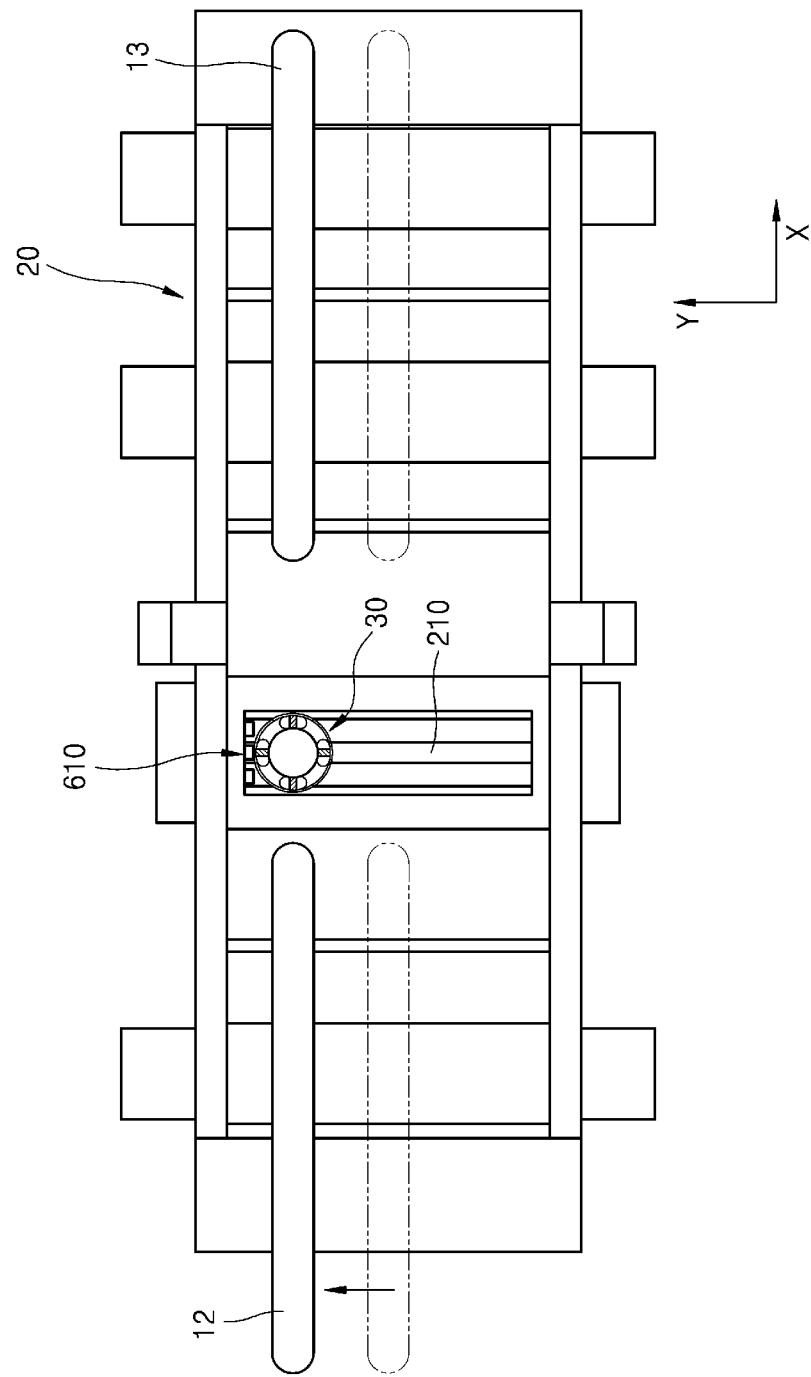
FIG. 11 is a plan view of a bicycle simulator according to an embodiment.

FIG. 9 is a display screen for displaying a change in a traveling path of a bicycle avatar, according to an embodiment. FIG. 10 is a partial perspective view of a bicycle simulator according to an embodiment. FIG. 11 is a plan view of a bicycle simulator according to an embodiment.

As illustrated in FIG. 9, when a particular path, for example, a forked road, is displayed on the traveling path of the bicycle avatar T displayed on the display 95 according to an embodiment, the rider R may select a traveling path in one direction from the forked road to continue riding the bicycle. For example, when the traveling path displayed on the display 95 is a rotary traveling path that continuously rotates in one direction, as illustrated in FIGS. 6A and 6B, a rotary traveling direction of the bicycle 10 may be sensed by the first sensor 610 that senses the movement of the frame support portion 30 in one direction. Also, as an example, the rotary traveling direction of the bicycle 10 may be sensed by not only the first sensor 610 but also contact sensors which are arranged on both inner portions of the base portion 20 and sense a contact with one of both side surfaces of the slide portion 220. Referring to FIG. 10, the bicycle simulator 1 according to an embodiment may further include the slide guide 210 arranged on the base portion 20, the slide portion 220 fixed to one end of the frame support portion 30 and connected to be movable along the slide guide 210, and the third sensor 630 arranged on each of both inner portions of the base portion 20 to sense a contact with one of both side surfaces of the slide portion 220. Matters related to the slide guide 210 and the slide portion 220 are the same as those illustrated in FIGS. 4A and 4B, and thus, descriptions thereof will be omitted.

The contact sensors may be arranged on both inner portions of the third sensor 630 to sense a contact with one of both side surfaces of the slide portion 220. As an example, the third sensor 630 may be implemented in the form of two microswitches which are arranged on both inner portions of the base portion 20, respectively. In this case, the third sensor 630 may be arranged at positions corresponding to both side surfaces of the slide portion 220, respectively. In the aforementioned embodiment, the microswitches are illustrated as an example of the third sensor 630, but the disclosure is not limited thereto. The third sensor 630 according to an embodiment may be implemented as any sensing device capable of sensing and tracking a contact between one inner side surface of the base portion 20 and one side surface of the slide portion 220.

Referring back to FIGS. 9 and 11, when the rider R according to an embodiment selects a right traveling path at a forked road, the rider R may select the traveling direction of the bicycle 10 to the right. In this case, the frame support portion 30, more specifically, the slide portion 220 that supports the frame support portion 30 and moves together may also move to the right. In the rotary traveling path such as a forked road, the rider R may continuously select the traveling direction of the bicycle 10 to the right, and thus, one side of the slide portion 220 may contact the third sensor 630 arranged on the right side of the base portion 20. When the contact between the third sensor 630 arranged on the right side of the base portion 20 and the slide portion 220 is detected, the processor 90 may identify that the traveling path of the bicycle 10 is selected to the right, and may determine the traveling path of the bicycle avatar T to the right at the forked road. A method of selecting the traveling path as described above may be used for all rotary traveling paths continuously rotating in one direction as well as forked traveling paths.

As described above, as the traveling state of the bicycle avatar implemented on the display changes according to the traveling state of the bicycle, the rider of the bicycle simulator 1 may virtually experience the same state as an outdoor traveling environment even indoors, and thus, the rider may enjoy more realistic riding indoors as well. Further, because the user shares a bicycle riding experience with a rider located in another space in the cyberspace, the rider may be provided with a virtual riding environment which is more realistic and exciting.

Figure 12:
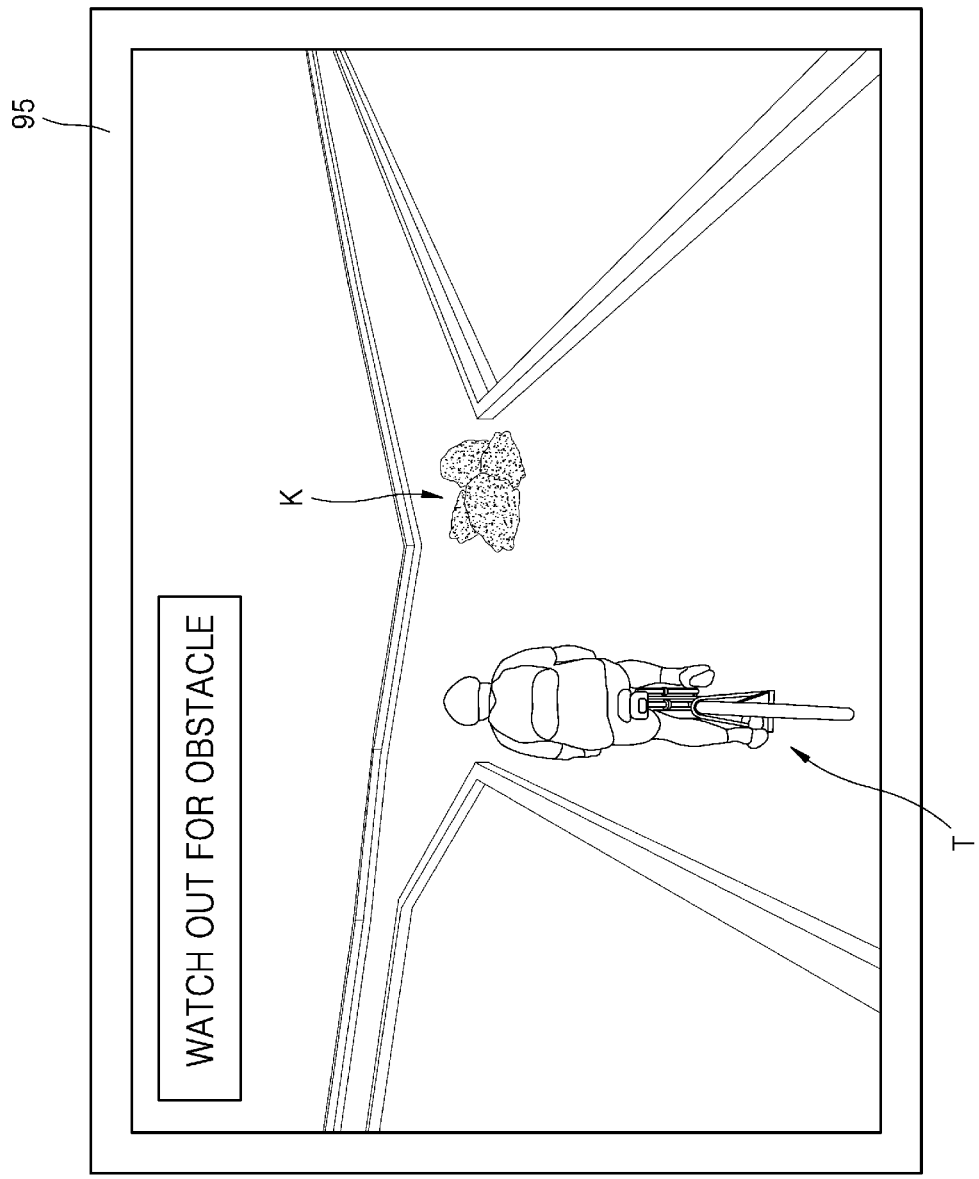
FIG. 12 is a display screen for displaying a traveling state of a bicycle avatar.

FIG. 12 is a display screen for displaying a traveling state of a bicycle avatar.

As illustrated in FIG. 12, in addition to the bicycle avatar T, an obstacle K such as a driving road, a tree, a boundary stone, and the like may be arranged on a bicycle traveling path displayed on the display 95 according to an embodiment. The processor 90 may recognize a position where the bicycle avatar T is arranged on the bicycle traveling path displayed on the display 95. In this case, the processor 90 may identify a distance between coordinates where the bicycle avatar T is arranged and coordinates where an obstacle or the like is arranged, and when the obstacle is arranged within a certain range and a risk of collision is recognized, the processor 90 may display a warning text on the display 95 to implement a traveling experience of the rider R more realistically.

Figure 13B:
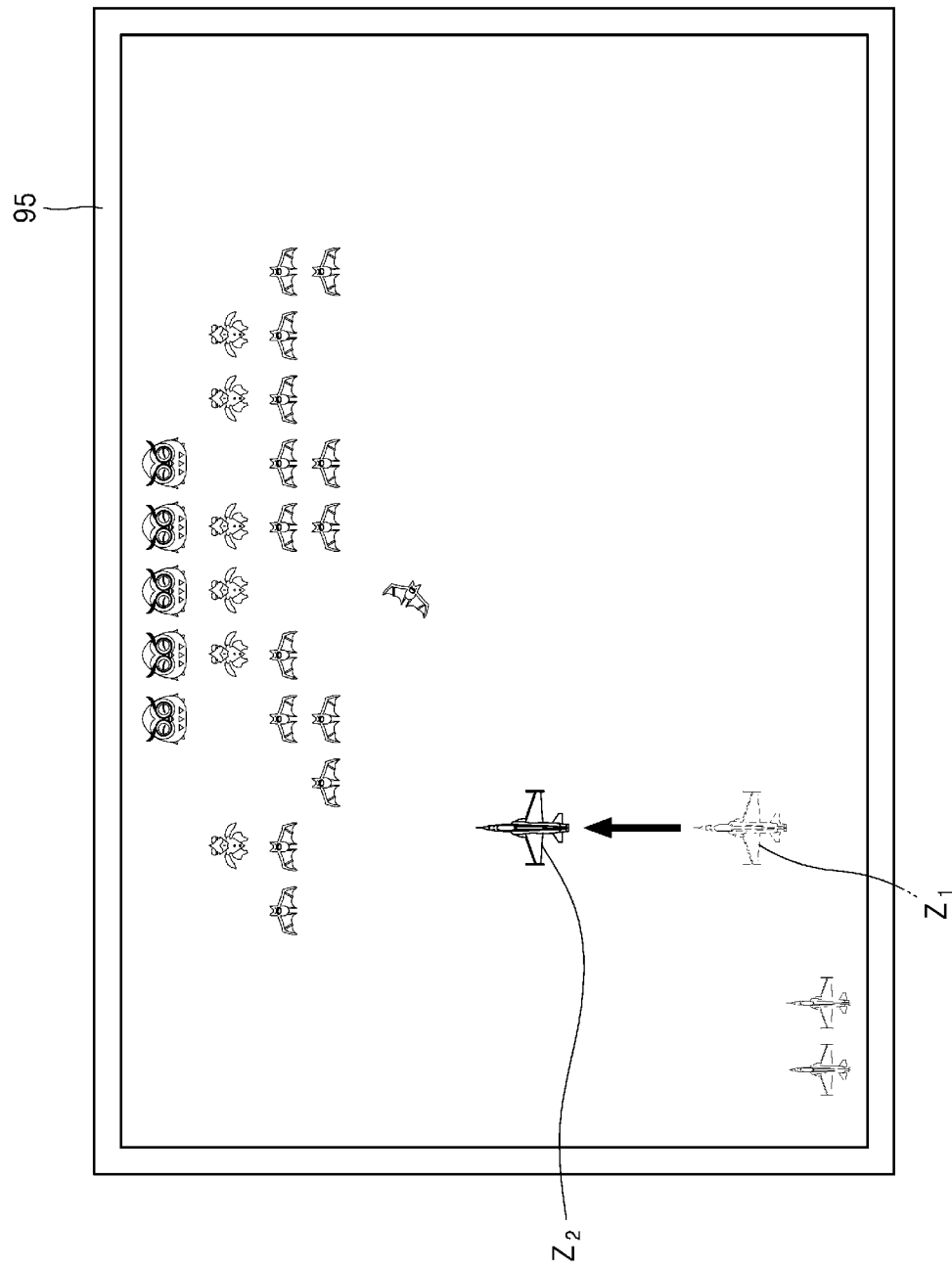
Figure 13C:
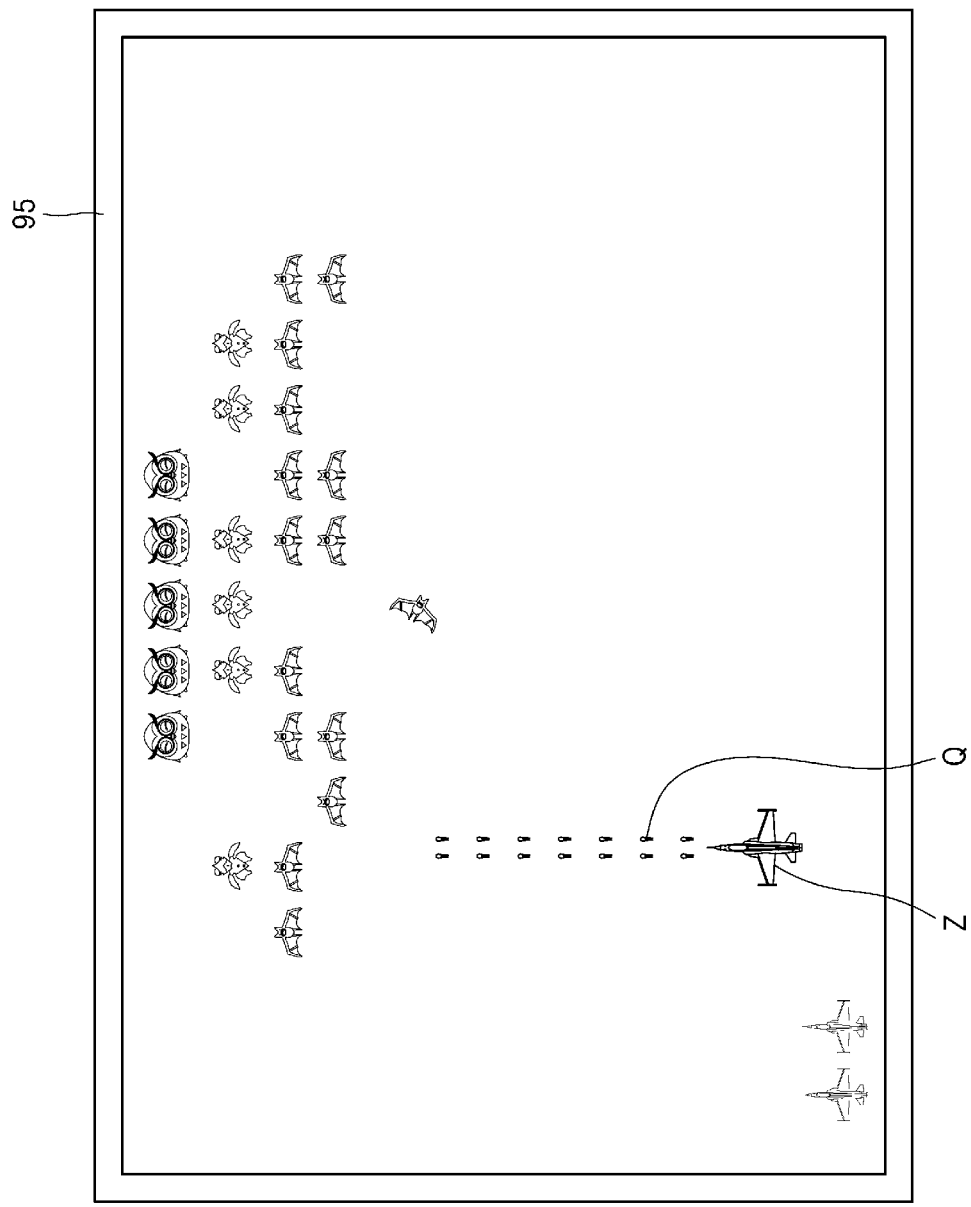

FIGS. 13A to 13C are display screens for displaying a game progress state according to an embodiment.

As illustrated in FIG. 4B, the bicycle simulator 1 according to an embodiment may further include the slide guide 210 arranged on the base portion 20, the slide portion 220 fixed to one end of the frame support portion 30 and connected to be movable along the slide guide 210, and the first sensor 610 capable of sensing a moving direction of the slide portion 220. Matters related to the slide guide 210 and the slide portion 220 are the same as those illustrated in FIGS. 4A and 4B, and thus, descriptions thereof will be omitted.

Referring to FIG. 13A, the display 95 according to an embodiment may display a character Z that may move left and right according to a traveling direction of the bicycle 10. As an example, the character Z is displayed in an airplane shape, but the specification is not limited thereto. In the specification, the character Z may be displayed on the display 95 and may be defined as any shape that may move together according to the left and right movement of the bicycle 10.

For example, as illustrated in FIG. 6B, when the bicycle 10 moves in the first direction Y, the first sensor 610 may sense a change in the movement of the slide portion 220 with respect to the base portion 20 in the first direction Y. The processor 90 may receive the change in the movement of the bicycle 10 by the first sensor 610, and the character may move rightward from a first position $Z_1$ before the movement to the second position $Z_2$ after the movement by using the processor 90.

Also, as illustrated in FIG. 7, the bicycle simulator 1 according to an embodiment may further include the second sensor 620 capable of sensing the rotation speed and the rotation distance of at least one of the front wheel roller 40 and the rear wheel roller 50. The second sensor 620 according to an embodiment may sense the rotation speed and rotation distance of at least one of the front wheel roller 40 and the rear wheel roller 50 and transmit the same to the processor 90, and the processor 90 may calculate the traveling speed of the bicycle 10 from circumferential sizes of the front wheel 12 and the rear wheel 13 and the number of rotations of the front wheel 12 and the rear wheel 13 per unit time.

Referring to FIG. 13B, the character Z that may move forward and backward according to the traveling speed of the bicycle 10 may be displayed on the display 95 according to an embodiment. For example, when the bicycle 10 is accelerated from a first traveling speed to a second traveling speed, an acceleration state of the bicycle 10 may be detected by using the second sensor 620. The processor 90 may receive a speed change of the bicycle 10 by the second sensor 620, and the character may move forward from the first position Z1 before the movement to the second position Z2 after the movement by using the processor 90.

As described above, the character Z may move up and down and move left and right on the display 95 according to the speed change and a left and right movement change of the bicycle 10. Accordingly, the bicycle simulator according to an embodiment may implement movement of the character Z displayed on the display 95 on a two-dimensional plane by using the speed change and the left and right movement change of the bicycle 10. Accordingly, the bicycle simulator according to an embodiment may be used in place of a control device such as a joystick used in a game machine. However, the disclosure is not limited thereto, and the bicycle simulator according to an embodiment may be used as any control device for controlling a two-dimensional movement of the character Z displayed on the display 95.

Although the movement change of the character Z according to the speed change and the left and right movement change of the bicycle 10 is controlled in the aforementioned embodiment, an operation state of the character Z may be controlled according to the speed change or the left and right movement change of the bicycle 10.

Accordingly, the bicycle simulator according to an embodiment may implement movement of the character Z displayed on the display 95 on a two-dimensional plane by using the speed change and the left and right movement change of the bicycle 10. As an example, a projectile Q is marked as a missile, but the specification is not limited thereto. In the specification, the projectile Q may be defined as any state of the character Z that may change according to the traveling speed of the bicycle 10, for example, firing of the projectile Q from the character Z, a change in a firing speed of the projectile Q fired from the character Z, or the like.

For example, when the bicycle 10 is accelerated from the first traveling speed to the second traveling speed, the acceleration state of the bicycle 10 may be detected by using the second sensor 620. The processor 90 may receive a speed change of the bicycle 10 by the second sensor 620, and the projectile Q may be fired from the character Z or the firing speed of the projectile Q may be increased by using the processor 90.

As described above, by sensing the traveling speed and the traveling direction of the bicycle 10 by using the first sensor 610 and the second sensor 620 and reflecting the sensed traveling speed and traveling direction on the character Z on the display 95, the rider R using the bicycle simulator according to an embodiment may experience the same virtual experience as controlling a movement and state change of another character Z while exercising by riding the bicycle 10.

Figure 14:
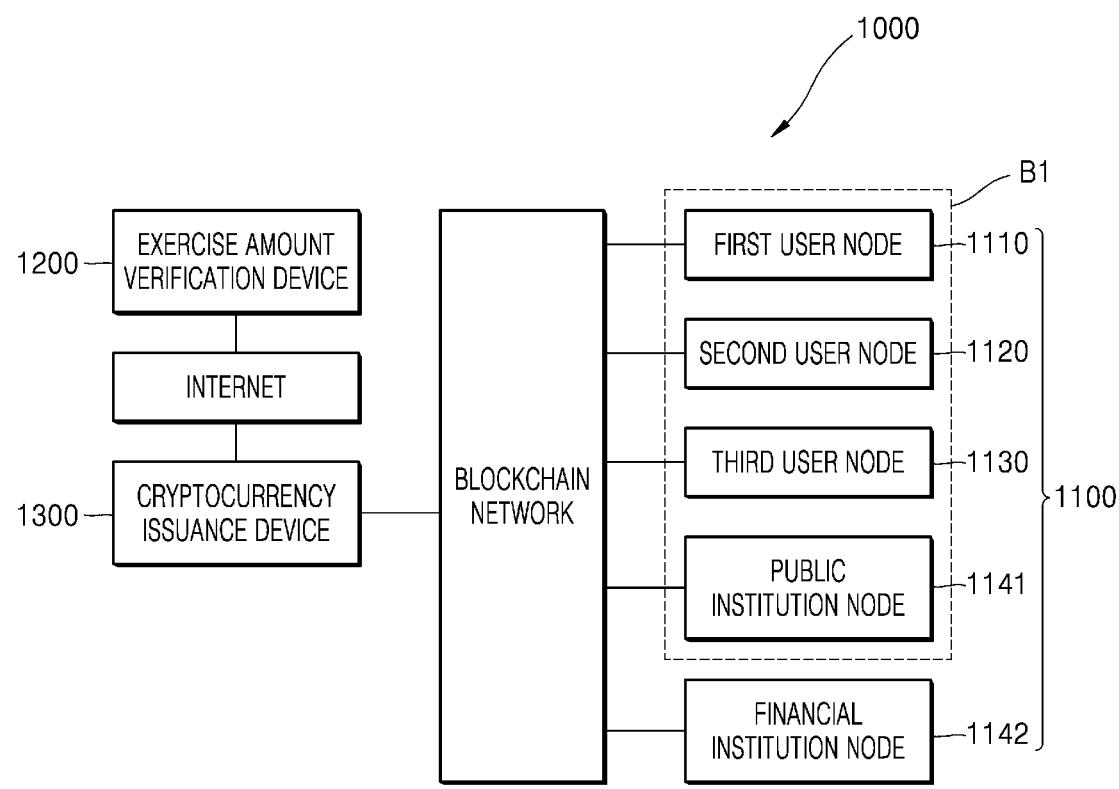
FIG. 14 is a block diagram illustrating a blockchain network system related to a bicycle simulator, according to an embodiment.

FIG. 14 is a block diagram illustrating a blockchain network system 1000 related to a bicycle simulator, according to an embodiment.

Referring to FIG. 14, a blockchain network system 1000 according to an embodiment may include one or more node computers 1100 and one or more cryptocurrency issuance devices 1300 that form a blockchain network. The blockchain network is a network in which the node computers 1100 are connected to each other in a peer-to-peer (P2P) manner through the Internet or the like. In order to form and manage the blockchain network and support each node computer 1100 to perform a function of a cryptocurrency transaction, a blockchain management server (not shown) may be connected to the blockchain network, as needed. The node computer 1100 that intends to join the blockchain network may be registered in the blockchain network by the blockchain management server. The cryptocurrency issuance device 1200 may be the same as the blockchain management server or may be installed separately from the blockchain management server.

The node computer 1100 belonging to the blockchain network is not particularly limited as long as it performs a general computing function. For example, the node computer 1100 may include a smartphone or a tablet personal computer (PC) that may access the Internet by mobile communication or Wi-Fi, a desktop PC that may access the Internet by LAN or Wi-Fi, a laptop PC, etc.

The node computer 1100 according to an embodiment may include user nodes 1110 to 1130 and trader nodes 1141 and 1142. The user nodes 1110 to 1130 may be servers used by the rider R using the bicycle simulator 1. In this case, one or more user nodes may be connected to the blockchain network system 1000. For example, when there are three riders R using the bicycle simulator 1, the first user node to the third user node 1110 to 1130 may be formed.

As an example, the trader nodes 1141 and 1142 may be servers used by a transaction target which trades a cryptocurrency generated by the cryptocurrency issuance device 1200 with the user nodes 1110 to 1130. For example, the trader node may be the public institution node 1141 or the financial institution node 1142 that desires to trade exercise information of the rider R. For example, public institutions may include a health insurance corporation, a national health and medical institution, and a health care-related institution included in various local governments that may use health information of the rider R by using the exercise information of the rider R, but is not limited thereto. Also, for example, financial institutions may include a private medical insurance company or a private medical insurance institution that may use the health information of the rider R by using the exercise information of the rider R, but is not limited thereto.

In the aforementioned embodiment, a target that may be included in the node computer 1100 is set as the user nodes 1110 to 1130, the public institution node 1141, and the financial institution node 1142, but the disclosure is not limited thereto. The target that may be included in the node computer 1100 may be any party that may use exercise amount data generated by using the bicycle simulator 1, and may be a server used by the corresponding party.

An exercise amount verification device 1200 is a device that an owner of the node computer 1100 belonging to the blockchain network has, and may be installed or connected to the bicycle simulator 1 according to an embodiment of the disclosure. A traveling path, a traveling distance, a traveling speed, a traveling time, and the like of the rider R who has been traveling by using the bicycle simulator 1 may be used as data for verifying the amount of exercise by the exercise amount verification device 1300. In this case, because the owner of the user nodes 1110 to 1130, that is, the rider R using the bicycle simulator 1 receives a cryptocurrency newly issued by the cryptocurrency issuance device 1200, the owner is referred to as a cryptocurrency recipient in the specification. The exercise amount verification device 1300 may store information about the same cryptocurrency recipient as the owner of the node computer 1100, for example, an ID, and the like so that it may be identified that the exercise amount verification device 1300 and the node computer 1100 are owned or managed by the same owner.

The exercise amount verification device 1300 transmits the exercise amount data obtained by using the bicycle simulator 1 to the cryptocurrency issuance device 1200. In this case, when the exercise amount verification device 1300 and the node computer 1100 are the same device, the exercise amount verification device 1300 and the node computer 1100 need to belong to the same blockchain network. However, the disclosure is not limited thereto, and when the exercise amount verification device 1300 and the node computer 1100 are separately formed, the exercise amount verification device 1300 does not necessarily belong to a blockchain network, and may be connected to the cryptocurrency issuance device 1200 through another communication network, for example, the Internet.

Also, the exercise amount verification device 1300 may be implemented in the form of a distributed application (dAPP), that is, a distributed application program, and connected to the blockchain network. In this case, not only one particular node computer connected to the blockchain network serves as the cryptocurrency issuance device 1200, but one or more node computers 1100 connected to the blockchain network may operate as the cryptocurrency issuance device 1200.

The cryptocurrency issuance device 1200 receives and verifies the exercise amount data, and then newly issues a cryptocurrency proportional to the achieved amount of exercise to the cryptocurrency recipient. In this case, when the newly issued cryptocurrency is paid to the cryptocurrency recipient, it means that a new block is generated by the cryptocurrency issuance device 1200 or the node computer 1100, and the block is transmitted to another node computer 1100 and verified, and thus, the payment of the newly issued cryptocurrency is confirmed, and the transaction is stored in all or some node computers 1100 belonging to the blockchain network. Thereafter, the same cryptocurrency recipient may identify the amount of a cryptocurrency paid by using his/her node computer 1100 or another computing device, and may transfer the paid cryptocurrency to an electronic wallet and then use the same for cryptocurrency transactions.

According to an embodiment, a range of a new blockchain network formed by the cryptocurrency issuance device 1200 and the node computer 1100 may be set differently. For example, when the node computer 1100 includes one or more user nodes 1110 to 1130 and one or more trader nodes 1141 and 1142, a range of a blockchain network may be set differently according to a range of participants participating in the blockchain network.

For example, when a cryptocurrency formed by the cryptocurrency issuance device 1200 is used only in a particular financial institution, the range B1 of the new blockchain network forming the cryptocurrency may be set as the user nodes 1110 to 1130 and the public institution node 1141. The cryptocurrency generated in the range B1 of the new blockchain network may be generated only between the user nodes 1110 to 1130 and the public institution node 1142. Also, after the paid cryptocurrency is transferred to the electronic wallet, the cryptocurrency may be used only in cryptocurrency transactions between the user nodes 1110 to 1130 and the public institution node 1142.

In the foregoing descriptions, particular embodiments of the disclosure have been described and illustrated, but the disclosure is not limited to the embodiments described above. It will be apparent to those skilled in the art that various modifications and variations may be made without departing from the spirit and scope of the disclosure. Therefore, such modifications or variations should not be individually understood from the technical spirit or point of view of the disclosure, and modified embodiments should be said to belong to the claims of the disclosure.

The invention claimed is:

1. A bicycle simulator comprising:
   a base portion having two side surfaces;
   a frame support portion supporting a frame of a mounted bicycle connecting a front wheel and a rear wheel of a bicycle, the frame support portion operably connected to the base portion and configured to be movable in a direction based on a traveling direction of the mounted bicycle;
   a first sensor configured to sense a moving distance and a moving direction of the frame support portion;
   a communication circuit configured to receive the moving distance and the moving direction of the frame support portion sensed by the first sensor;
   a processor configured to generate a bicycle avatar of which a traveling direction changes according to the moving distance and the moving direction of the frame support portion transmitted from the communication circuit;
   a display configured to display a traveling state of the bicycle avatar;
   a slide guide arranged to be fixed between the two side surfaces of the base portion;
   a slide portion fixed to one end of the frame support portion and configured to be movable on the slide guide;
   wherein the first sensor is configured to sense a moving direction and a moving distance of the slide portion moving on the slide guide;
   a second sensor configured to sense a rotation speed and a rotation distance of at least one of a front wheel roller and a rear wheel roller; and
   a pair of third sensors, each third sensor arranged on a respective side surface of the base portion to sense a contact between the slide portion and one of the side surfaces.

2. The bicycle simulator of claim 1, wherein the processor is configured to determine a traveling direction of the bicycle avatar according to the moving direction of the frame support portion, and determine a position of the bicycle avatar on a traveling path according to the moving distance of the frame support portion.

3. The bicycle simulator of claim 1, further comprising:
   the front wheel roller supporting the front wheel of the bicycle and rotating together with rotation of the front wheel; and the rear wheel roller supporting the rear wheel of the bicycle and rotating together with rotation of the rear wheel.

4. The bicycle simulator of claim 3, wherein the processor is configured to determine a traveling speed of the bicycle avatar according to the rotation speed of at least one of the front wheel roller and the rear wheel roller sensed by the second sensor, and determine a traveling distance of the bicycle avatar according to the rotation distance of at least one of the front wheel roller and the rear wheel roller sensed by the second sensor.

5. The bicycle simulator of claim 1, further comprising: a weight measurement portion configured to measure a weight of a rider riding the bicycle; and an input portion configured to input at least one of a model of the bicycle and information about the rider riding the bicycle.

6. The bicycle simulator of claim 5, wherein the processor is configured to generate a bicycle avatar according to information about the rider and a bicycle input by the weight measurement portion and the input portion, respectively.

7. The bicycle simulator of claim 1, wherein the processor is configured to, when contact of the slide portion with a respective side surface of the base portion is sensed by a respective third sensor, adjust a traveling path of the bicycle avatar so that the bicycle avatar travels along a particular path.

8. The bicycle simulator of claim 7, wherein the particular path is a traveling environment including a forked road, and a traveling direction of the forked road is determined according to a respective side surface of the base portion in contact with the slide portion.

9. The bicycle simulator of claim 1, wherein the processor is configured to, when the bicycle avatar is arranged to be adjacent to an obstacle or another avatar with a certain interval or less, display a warning message on the display.

10. The bicycle simulator of claim 3, wherein the processor is configured to determine the traveling state of the bicycle avatar on a flat traveling road and an inclined traveling road on which the bicycle avatar travels, according to the rotation speed of at least one of the front wheel roller and the rear wheel roller sensed by the second sensor.

11. The bicycle simulator of claim 1, wherein, when the bicycle avatar travels in a traveling environment including a forked road, a traveling direction of the forked road is determined according to a change in the moving direction sensed by the first sensor.

12. A blockchain network system comprising:
a cryptocurrency issuance device configured to generate a cryptocurrency according to exercise amount data obtained from a bicycle simulator of claim 1; and
a node computer configured to form the cryptocurrency issuance device and a blockchain network.

13. The blockchain network system of claim 12, wherein the node computer includes at least one user node that is used by a rider using the bicycle simulator and receives the cryptocurrency generated by the cryptocurrency issuance device.

14. The blockchain network system of claim 13, wherein the node computer includes at least one trader node that trades the cryptocurrency with the at least one user node.

15. The blockchain network system of claim 14, wherein a range of the blockchain network is set differently according to a range of a participant participating in the blockchain network among the at least one user node and the at least one trader node.

16. The blockchain network system of claim 12, further comprising an exercise amount verification device configured to verify exercise amount data achieved by using the bicycle simulator and transmit the exercise amount data to the cryptocurrency issuance device.

17. A bicycle simulator comprising:
a base portion having two side surfaces;
a frame support portion supporting a frame of a mounted bicycle connecting a front wheel and a rear wheel of a bicycle, and the frame support portion connected to the base portion and configured to be movable in a direction based on a traveling direction of the mounted bicycle;
a first sensor configured to sense a moving distance and a moving direction of the frame support portion;
a communication circuit configured to receive the moving distance and the moving direction of the frame support portion sensed by the first sensor;
a processor configured to generate a character of which a traveling direction changes according to the moving distance and the moving direction of the frame support portion transmitted from the communication circuit;
a display configured to display a traveling state of the character;
a slide guide arranged to be fixed between the two side surfaces of the base portion;
a slide portion fixed to one end of the frame support portion and configured to be movable on the slide guide,
wherein the first sensor is configured to sense a moving direction and a moving distance of the slide portion moving on the slide guide;
a second sensor configured to sense a rotation speed and a rotation distance of at least one of a front wheel roller and a rear wheel roller; and
a pair of third sensors, each third sensor arranged on a respective side surface of the base portion and configured to sense a contact between the slide portion and a respective side surface of the base portion.

18. The bicycle simulator of claim 17, wherein the processor is configured to determine a moving direction of the character according to the moving direction of the frame support portion, and determine a position of the character according to the moving distance of the frame support portion.

19. The bicycle simulator of claim 17, further comprising:
the front wheel roller supporting the front wheel of the bicycle and rotating together with rotation of the front wheel; and
the rear wheel roller supporting the rear wheel of the bicycle and rotating together with rotation of the rear wheel.

20. The bicycle simulator of claim 19, wherein the processor is configured to determine a forward or backward movement of the character according to the rotation speed of at least one of the front wheel roller and the rear wheel roller sensed by the second sensor.

21. The bicycle simulator of claim 19, wherein the processor is configured to determine whether or not to fire a projectile to be fired from the character or a firing speed of the projectile, according to the rotation speed of at least one of the front wheel roller and the rear wheel roller sensed by the second sensor.

* * * * *